United States Patent
Ryu et al.

(10) Patent No.: US 11,172,525 B2
(45) Date of Patent: **\*Nov. 9, 2021**

(54) METHOD AND APPARATUS FOR TRANSMITTING AND RECEIVING SIGNAL IN COMMUNICATION SYSTEM SUPPORTING DEVICE TO DEVICE SCHEME

(71) Applicant: Samsung Electronics Co., Ltd., Suwon-si (KR)

(72) Inventors: Hyun-Seok Ryu, Yongin-si (KR); Peng Xue, Hwaseong-si (KR); Sang-Won Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,090

(22) Filed: Dec. 10, 2019

(65) Prior Publication Data

US 2020/0120730 A1 Apr. 16, 2020

Related U.S. Application Data

(63) Continuation of application No. 16/041,195, filed on Jul. 20, 2018, now Pat. No. 10,517,128, which is a
(Continued)

(30) Foreign Application Priority Data

Feb. 6, 2015 (KR) .................. 10-2015-0018650
Aug. 13, 2015 (KR) .................. 10-2015-0114867

(51) Int. Cl.
*H04W 76/14* (2018.01)
*H04W 52/14* (2009.01)
(Continued)

(52) U.S. Cl.
CPC ............. *H04W 76/14* (2018.02); *H04W 4/06* (2013.01); *H04W 8/005* (2013.01); *H04W 48/16* (2013.01);
(Continued)

(58) Field of Classification Search
CPC . H04W 76/14; H04W 52/325; H04W 52/383; H04W 48/16; H04W 8/005
See application file for complete search history.

(56) References Cited

U.S. PATENT DOCUMENTS 10,034,322 B2   7/2018   Ryu et al.
10,292,193 B2   5/2019   Qin
(Continued)

FOREIGN PATENT DOCUMENTS

WO   2014/034573 A1   3/2014
WO   2014/134573 A1   9/2014
(Continued)

OTHER PUBLICATIONS

European Office Action dated May 6, 2020, issued in a counterpart European Application No. 16 746 876.8-1205.
(Continued)

*Primary Examiner* — Min Jung
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method for transmitting a device to device (D2D) discovery signal by a user equipment (UE) in a communication system supporting a D2D scheme is provided. The method includes determining transmission power for D2D discovery signal transmission, and transmitting a D2D discovery signal using the transmission power, wherein the transmission power is
(Continued)

determined by considering a cell at which the D2D discovery signal is transmitted.

12 Claims, 7 Drawing Sheets

Related U.S. Application Data continuation of application No. 15/017,037, filed on Feb. 5, 2016, now Pat. No. 10,034,322.

(51) Int. Cl.
*H04W 52/32* (2009.01)
*H04W 52/38* (2009.01)
*H04W 8/00* (2009.01)
*H04W 4/06* (2009.01)
*H04W 48/16* (2009.01)
*H04W 52/24* (2009.01)
*H04W 72/04* (2009.01)
*H04W 72/08* (2009.01)
*H04W 92/18* (2009.01)

(52) U.S. Cl.
CPC ....... *H04W 52/146* (2013.01); *H04W 52/325* (2013.01); *H04W 52/383* (2013.01); *H04W 52/242* (2013.01); *H04W 52/243* (2013.01); *H04W 72/042* (2013.01); *H04W 72/0473* (2013.01); *H04W 72/0493* (2013.01); *H04W 72/082* (2013.01); *H04W 92/18* (2013.01)

(56) References Cited

U.S. PATENT DOCUMENTS

| 10,595,286 | B2* | 3/2020 | Ryu | H04L 5/003 |
|---|---|---|---|---|
| 2012/0269072 | A1 | 10/2012 | Wu et al. | |
| 2013/0109301 | A1 | 5/2013 | Hakola et al. | |
| 2013/0183963 | A1 | 7/2013 | Turtinen et al. | |
| 2013/0288608 | A1 | 10/2013 | Fwu et al. | |
| 2013/0308490 | A1 | 11/2013 | Lim et al. | |
| 2014/0295829 | A1 | 10/2014 | Turtinen et al. | |
| 2016/0127881 | A1 | 5/2016 | Kim et al. | |
| 2016/0157081 | A1 | 6/2016 | Kwak et al. | |
| 2016/0174176 | A1* | 6/2016 | Adachi | H04B 17/318 370/350 |
| 2016/0219541 | A1* | 7/2016 | Chatterjee | H04W 74/004 |
| 2016/0278155 | A1* | 9/2016 | Fukuta | H04W 48/10 |
| 2016/0286375 | A1 | 9/2016 | Fujishiro | |
| 2017/0013640 | A1 | 1/2017 | Loehr et al. | |
| 2017/0215160 | A1 | 7/2017 | Loehr et al. | |
| 2017/0223669 | A1* | 8/2017 | Ma | H04W 16/14 |
| 2017/0257846 | A1 | 9/2017 | Kim et al. | |
| 2017/0353932 | A1* | 12/2017 | Sorrentino | H04W 52/383 |
| 2018/0020412 | A1* | 1/2018 | Lee | H04W 52/322 |
| 2018/0338257 | A1* | 11/2018 | Jung | H04W 28/16 |
| 2019/0191290 | A1* | 6/2019 | Poitau | H04W 72/0413 |
| 2020/0323003 | A1* | 10/2020 | Chae | H04W 52/325 |
| 2020/0351139 | A1* | 11/2020 | Chae | H04W 52/54 |

FOREIGN PATENT DOCUMENTS

| WO | 2014/196771 A1 | 12/2014 |
|---|---|---|
| WO | 2015/005751 A1 | 1/2015 |

OTHER PUBLICATIONS

Chinese Office Action dated Jun. 1, 2020, issued in a counterpart Chinese Application No. 201680019652.7.
Samsung; In-band emission impact of D2D discovery3GPP TSG RAN WG1 Meeting #75; R1-135225; Nov. 15, 2013, San Francisco, CA, USA.
Samsung; Resource allocation for Type-1 discovery and WAN impact 3GPP TSG RAN WG1 Meeting #76bis R1-141304; Apr. 4, 2014, Shenzhen, China.
Baccelli et al.; On the Design of Device-to-Device Autonomous Discovery; XP03215033; IEEE; Jan. 2, 2012.
ZTE, Data Flow for D2D Intra-Cell and Inter-Cell Discovery, 3GPP TSG-RAN WG2 Meeting #85bis, Mar. 31-Apr. 4, 2014, R2-141673, Valencia, Spain.
European Search Repod dated Dec. 4, 2017, issued in the European Application No. 16746876.8-1875/3254506.
European Office Action dated Dec. 7, 2020, issued in a counterpart European Application No. 16746876.8.

* cited by examiner

METHOD AND APPARATUS FOR TRANSMITTING AND RECEIVING SIGNAL IN COMMUNICATION SYSTEM SUPPORTING DEVICE TO DEVICE SCHEME

CROSS-REFERENCE TO RELATED APPLICATION(S)

This application is a continuation application of prior application Ser. No. 16/041,195, filed on Jul. 20, 2018, which will be issued as U.S. Pat. No. 10,517,128 on Dec. 24, 2019, which is based on prior application Ser. No. 15/017,037, filed on Feb. 5, 2016, which has issued as U.S. Pat. No. 10,034,322 on Jul. 24, 2018 and was based on and claimed priority under 35 U.S.C. § 119(a) of a Korean patent application number 10-2015-0018650, filed on Feb. 6, 2015, and of a Korean patent application number 10-2015-0114867, filed on Aug. 13, 2015, in the Korean Intellectual Property Office, the disclosure of which is incorporated by reference herein in its entirety.

TECHNICAL FIELD

The present disclosure relates to a method and apparatus for transmitting and receiving a signal in a communication system supporting a device to device (D2D) scheme. More particularly, the present disclosure relates to a method and apparatus for transmitting and receiving a D2D signal in a communication system supporting a D2D scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (COMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Recently, data traffic has increased drastically due to the dissemination of smart phones. The number of smart phone users increases, and application services using the smart phones, such as a social networking service (SNS), games, and the like are more popularized, so the data traffic is expected to increase much more than now.

In particular, if even intelligent machine-to-machine (M2M) communication utilizing things, such as communication between people and things, communication between things, and the like, which is expected to provide a new mobile market, is popularized in addition to the communication between people, the traffic transmitted to a base station (BS) or an evolved node B (eNB) is expected to increase dramatically, so it may be difficult to deal with the traffic.

As technology capable of addressing these issues, a direct communication technology between devices has attracted great attention. This technology, which will be referred to D2D communication, has attracted great attention for all of a licensed band in a mobile communication system and an unlicensed band such as a wireless local area network (WLAN).

A D2D communication technology which is based on an LTE scheme of the 3rd generation partnership project (3GPP) may be classified into a D2D discovery procedure and a D2D communication procedure.

The D2D discovery procedure denotes a procedure in which one device identifies identities or interests of other devices which are proximate to the device, or informs an identity or an interest of the device to the other devices which are proximate to the device. Here, an identity or an interest may be an identifier (ID) of a device, an application ID, a service ID, or/and the like, and may be implemented with various forms according to a D2D service and operating scenario.

A D2D discovery procedure which has been studied in a technology of the related art is based on an environment in which a serving cell of a device is configured with a single frequency. Further, a D2D transmitting procedure which is supported in a technology of the related art has been performed only at a serving carrier as a frequency which is used by a serving cell.

So, there is a need for an operation and a procedure for transmitting a D2D discovery signal through a non-serving carrier as a frequency which is not used in a serving cell.

An LTE mobile communication system may support a carrier aggregation (CA) scheme for increasing efficiency of a cellular frequency resource and a data rate. In the CA scheme, a serving cell may be configured with a multi-carrier, and may perform a receiving operation and a transmitting operation on different frequencies at the same time.

So, there is a need for an operation and a procedure for applying a CA scheme in a D2D communication system which is based on a cellular scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for transmitting and receiving a device to device (D2D) discovery signal in a communication system supporting a D2D scheme.

Another aspect of the present disclosure is to provide a method and apparatus for controlling transmission power used for transmitting a D2D discovery signal in a communication system supporting a D2D scheme.

Another aspect of the present disclosure is to provide a method and apparatus for transmitting and receiving a D2D discovery signal on a carrier which is not used at a serving cell in a communication system supporting a D2D scheme.

Another aspect of the present disclosure is to provide a method and apparatus for controlling transmission power used for transmitting a D2D discovery signal on a carrier which is not used at a serving cell in a communication system supporting a D2D scheme.

Another aspect of the present disclosure is to provide a method and apparatus for transmitting and receiving system information in a communication system supporting a D2D scheme.

Another aspect of the present disclosure is to provide a method and apparatus for transmitting and receiving system information of a neighbor cell at a serving cell in a communication system supporting a D2D scheme.

Another aspect of the present disclosure is to provide a method and apparatus for transmitting and receiving system information for inter-carrier D2D discovery in a communication system supporting a D2D scheme.

Another aspect of the present disclosure is to provide a method and apparatus for transmitting and receiving a discovery signal for inter-carrier D2D discovery in a communication system supporting a D2D scheme.

Another aspect of the present disclosure is to provide a method and apparatus for controlling transmission power used for transmitting a discovery signal for inter-carrier D2D discovery in a communication system supporting a D2D scheme.

In accordance with an aspect of the present disclosure, a method for transmitting a D2D discovery signal by a user equipment (UE) in a communication system supporting a D2D scheme is provided. The method includes determining transmission power for D2D discovery signal transmission, and transmitting a D2D discovery signal using the transmission power, wherein the transmission power is determined by considering a cell at which the D2D discovery signal is transmitted.

In accordance with another aspect of the present disclosure, a method for supporting D2D discovery signal transmission in a UE by a serving base station (BS) in a communication system supporting a D2D scheme is provided. The method includes detecting D2D discovery resource information for another cell, and broadcasting the D2D discovery resource information for the other cell.

In accordance with another aspect of the present disclosure, a UE in a communication system supporting a D2D scheme is provided. The UE includes a processor configured to perform an operation of determining transmission power for D2D discovery signal transmission, and perform an operation of transmitting a D2D discovery signal using the transmission power, wherein the transmission power is determined by considering a cell at which the D2D discovery signal is transmitted.

In accordance with another aspect of the present disclosure, a serving BS in a communication system supporting a D2D scheme is provided. The serving BS includes a processor configured to perform an operation of detecting D2D discovery resource information for another cell, and perform an operation of broadcasting the D2D discovery resource information for the other cell.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document. The terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
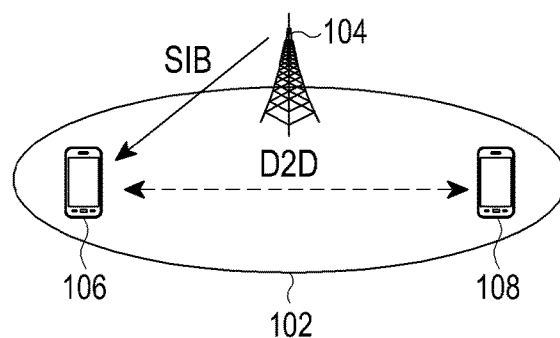
FIG. 1 schematically illustrates a configuration of a communication system supporting a device to device (D2D) scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a television (TV) box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure provides a method and apparatus for transmitting and receiving a device to device (D2D) discovery signal in a communication system supporting a D2D scheme.

An embodiment of the present disclosure provides a method and apparatus for controlling transmission power used for transmitting a D2D discovery signal in a communication system supporting a D2D scheme.

An embodiment of the present disclosure provides a method and apparatus for transmitting and receiving a D2D discovery signal on a carrier which is not used at a serving cell in a communication system supporting a D2D scheme.

An embodiment of the present disclosure provides a method and apparatus for controlling transmission power used for transmitting a D2D discovery signal on a carrier which is not used at a serving cell in a communication system supporting a D2D scheme.

An embodiment of the present disclosure provides a method and apparatus for transmitting and receiving system information in a communication system supporting a D2D scheme.

An embodiment of the present disclosure provides a method and apparatus for transmitting and receiving system information of a neighbor cell at a serving cell in a communication system supporting a D2D scheme.

An embodiment of the present disclosure provides a method and apparatus for transmitting and receiving system information for inter-carrier D2D discovery in a communication system supporting a D2D scheme.

An embodiment of the present disclosure provides a method and apparatus for transmitting and receiving a discovery signal for inter-carrier D2D discovery in a communication system supporting a D2D scheme.

An embodiment of the present disclosure provides a method and apparatus for controlling transmission power used for transmitting a discovery signal for inter-carrier D2D discovery in a communication system supporting a D2D scheme.

A method and apparatus proposed in various embodiments of the present disclosure may be applied to various communication systems such as an institute of electrical and electronics engineers (IEEE) 802.16ac communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, an internet protocol television (IPTV) service, and the like, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rdgeneration partnership project 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system, and/or the like.

FIG. 1 schematically illustrates a configuration of a communication system supporting a D2D scheme according to an embodiment of the present disclosure.

Referring to FIG. 1, the communication system includes a base station (BS) 104 which covers a service area, e.g., a cell 102. Here, the term BS may be interchangeable with the term enhanced node B (eNB), node B, access point (AP), or/and the like. The term cell may be interchangeable with the term carrier, or/and the like. The BS 104 may manage a wireless resource which is used in the cell 102. A user equipment (UE) 106, which is located within the cell 102, may set up a D2D interface for a D2D scheme with a UE 108 which is located within the same cell, i.e., the cell 102 or another cell (not shown in FIG. 1). Here, the term UE may be interchangeable with the term device, D2D device, terminal, mobile station (MS), or/and the like. The D2D device denotes a device which supports the D2D scheme. All of the UEs 106 and 108, or at least one of the UEs 106 and 108 accesses a core network of the communication system through the BS 104, and the core network may support D2D communication for all of the UEs 106 and 108, or the at least one of the UEs 106 and 108.

Devices which support a D2D scheme are controlled by a network for authentication, security, and accounting in order to perform an operation according to the D2D scheme, and may request a connection to the network for D2D discovery if necessary.

Control signaling for a D2D scheme is transmitted and received between devices.

In an embodiment of the present disclosure, a protocol stack for a device to support a D2D scheme may include a D2D application layer, a D2D management layer, and a D2D transport layer.

The D2D application layer denotes a D2D service application program which is run on an operating system (OS) of a device. The D2D management layer is responsible for converting D2D discovery information, which is generated in the D2D service application program, to a format which is appropriate for the D2D transport layer. The D2D transport layer denotes a physical (PHY) layer and a medium access control (MAC) layer. The D2D transport layer may be identical to a PHY layer and a MAC layer of an LTE scheme or a Wi-Fi scheme.

A D2D discovery procedure may include the following procedure.

If a D2D application program is run, D2D discovery information for D2D discovery is generated in the D2D application layer, and the D2D discovery information is transferred to the D2D management layer. The D2D management layer converts the D2D discovery information which is transferred from the D2D application layer to a D2D management layer message. The D2D management layer message is transmitted through the D2D transport layer.

A device(s) which receives the D2D management layer message performs a receiving procedure in a reverse order of the procedure for transmitting the D2D management layer message as described above.

Further, a D2D communication procedure is a procedure in which traffic is directly transmitted and received between devices without a network infrastructure such as a BS, an AP, or/and the like.

The D2D communication procedure may be performed based on a result of a D2D discovery procedure after the D2D discovery procedure. That is, communication may be performed between devices which are discovered according to the D2D discovery procedure, or the D2D communication procedure may be performed without the D2D discovery procedure. For example, whether there is a need for performing a D2D discovery procedure before a D2D communication procedure may be determined according to a D2D service and operating scenario.

D2D service scenarios may be classified into a commercial service and a public safety service which relates to public safety. The term commercial service may be interchangeable with the term non-public safety service. The D2D service scenarios may include advertisement, a social network service (SNS), a game, a public safety and disaster network service, etc.

1) Advertisement

An operator of a communication network which supports a D2D scheme may advertise identities of devices which are deployed at a pre-registered store, cafe, theater, restaurant, and the like based on an inter-device D2D discovery scheme or an inter-device D2D communication scheme to other devices which are proximate to devices. Here, an interest may be a promotion of advertisers, event information or a discount coupon, and the like.

If an interest according to the advertised identities of the devices which are deployed at the pre-registered store, cafe, theater, restaurant, and the like is matched to an interest of the other device, the other device visits the pre-registered store, cafe, theater, restaurant, and the like or uses a cellular communication network or D2D communication of the related art to access the devices which are deployed at the pre-registered store, cafe, theater, restaurant, and the like thereby acquiring more information.

For another example, a device may discover another device which is deployed at a taxi which is proximate to the device through device D2D discovery, and transmit and receive data for a destination of the device, fare information, or/and the like with the other through a cellular communication or D2D communication of the related art.

2) SNS

A D2D device may transmit an application of the D2D device and an interest in the application to other D2D devices which exist in proximate areas. At this time, an identity or an interest which is used for D2D discovery may be a friend list which is provided in the application or an application ID of the application. After performing a D2D discovery operation, the D2D device may share contents such as a picture, a video, and the like that the D2D device has with proximate D2D devices using the inter-device direct communication.

3) Game

A user may discover devices and a game application through a D2D discovery operation for playing a mobile game with users which are proximate to the user, and perform an inter-device direct communication for transmitting and receiving data necessary for a game.

4) Public Safety and Disaster Network Service

A police officer, a firefighter, and the like may use a D2D scheme for a purpose of public safety. That is, in a case in which a cellular communication is impossible since a cellular network of the related art is partially destroyed due to an emergency situation such as fire or/and the like, or a natural disaster such as a landslide, an earthquake, the eruption of a volcano, a tsunami, or/and the like, a police officer and a firefighter may discover a colleague which is proximate using a D2D scheme or share his/her emergency situation information with proximate users.

Release 12 proposed in an LTE standard of a 3GPP (hereinafter, "Rel-12 LTE") has standardized all of D2D discovery and D2D communication.

D2D discovery in the Rel-12 LTE is for a commercial use, and is designed thereby operating only in network coverage of a BS. That is, the D2D discovery is not supported in a case in which there is no BS or out of coverage of the BS.

Further, D2D communication in the Rel-12 LTE is for a public safety and a disaster network service, not a commercial use, and needs to be supported in partial network coverage where some devices are in network coverage and some devices are out of network coverage as well as in network coverage and out of network coverage. So, in the public safety and disaster network service, a D2D communication procedure needs to be performed without performing a D2D discovery procedure.

In the Rel-12 LTE, both of a D2D discovery procedure and a D2D communication procedure are performed on an uplink sub-frame. That is, a transmitting device transmits a D2D discovery signal and data for D2D communication on uplink sub-frame, and a receiving device receives the D2D discovery signal and the data for the D2D communication, which are transmitted by the transmitting device on the uplink sub-frame.

In an LTE mobile communication system of the related art including an LTE mobile communication system in previous Release such as a Release 11 (Rel-11), and the like, a device receives data and control information from a BS through a downlink, and transmits data and control information to the BS through an uplink. So, an operation of a D2D transceiver may be different from an operation of a D2D transceiver in an LTE mobile communication system of the related art.

For example, a device which does not support a D2D scheme includes a receiver which is based on an orthogonal frequency division multiple access (OFDMA) scheme for receiving a downlink data and control information, and a transmitter which is based on a single carrier-FDMA (SC-FDMA) scheme for transmitting uplink data and control information.

Further, a device which supports all of a cellular scheme and a D2D scheme includes a receiver for receiving downlink signals from a BS which is based on an OFDMA scheme, a transmitter for transmitting data or control information, or D2D data or control information to the BS through a uplink which is based on an SC-FDMA scheme, and an additional SC-FDMA transmitter for transmitting D2D data or control information through an uplink.

In the Rel-12 LTE, a D2D scheme defines two types of D2D discovery according to a resource allocating scheme.

1) Type 1 Discovery

A BS broadcasts information on a resource pool of an uplink which is usable for D2D discovery to devices which support a D2D scheme (D2D devices) through a system information block (SIB). The SIB may be reached at all D2D devices within a cell which is managed by a BS.

The information on the resource pool of the uplink which is usable for the D2D discovery may include information on a size of an uplink resource which is usable for the D2D discovery. For example, the information on the size of the uplink resource, which is usable for the D2D discovery, may include the number of sub-frames which are resources on a time axis "x", information on y resource blocks (RBs) which are resources on a frequency axis, and information on a resource allocation period. For example, the information on the y RBs may include a start point and an end point for the y RBs, or may include a start point for the y RBs and an offset, i.e., y. The resource allocation period denotes a period by which a resource at a time axis and a resource at a frequency axis are allocated. For example, the resource allocation period may be z seconds.

Upon receiving the information on the resource pool of the uplink which is usable for the D2D discovery, each of the D2D devices selects a resource to be used and transmits a D2D discovery signal through the selected resource. Here, the resources which are selected in the D2D devices are distributed.

There may be a plurality of schemes in which D2D devices select a resource to be used for transmitting a D2D discovery signal from a resource pool allocated by a BS, and one of the plurality of schemes is a random selection scheme.

The random selection scheme will be described below.

If the random selection scheme is used, a D2D transmitting device randomly selects a resource within a resource pool for type 1 discovery which is detected through an SIB, and transmits a D2D discovery signal through the selected resource. Further, D2D receiving devices decode D2D discovery signals received through all resources within a resource pool for type 1 discovery which is detected through an SIB. The type 1 discovery may be used by both of a D2D device which is in a radio resource control (RRC) idle mode and a D2D device which is in an RRC connected mode.

2) Type 2 Discovery

A BS broadcasts information on a resource pool which needs to be monitored in D2D receiving devices for receiving a D2D discovery signal through an SIB. Resources used for transmitting a D2D discovery signal in D2D transmitting devices are scheduled by the BS. For convenience, a resource used for transmitting a D2D discovery signal in a D2D transmitting device will be referred to as "D2D transmission resource".

The BS commands D2D devices to transmit a D2D discovery signal through a specific time-frequency resource. The BS may perform a scheduling operation based on a semi-persistent scheduling scheme or a dynamic scheduling scheme, and a D2D transmitting device requests a D2D transmission resource by transmitting a signal such as a scheduling request (SR) signal, a buffer status report (BSR), or/and the like.

For performing the type 2 discovery, a D2D transmitting device needs to be in an RRC connected mode. So, a D2D transmitting device which is in an RRC idle mode transits into the RRC connected mode through a random access (RA) procedure for requesting a D2D transmission resource.

Further, D2D discovery needs to be supported between D2D devices which are located at different cells as well as D2D devices which are located at the same cell. So, the D2D discovery may be classified into intra-cell D2D discovery as discovery between D2D devices which are located at the same cell and inter-cell D2D discovery as discovery between D2D devices which are located at different cells. Here, the term intra-cell D2D discovery may be interchangeable with the term intra-carrier D2D discovery, or/and the like, and the term inter-cell D2D discovery may be interchangeable with the term inter-carrier D2D discovery, or/and the like. Each of the intra-cell D2D discovery and the inter-cell D2D discovery may be classified into a synchronization operation and a resource allocation operation.

Firstly, a synchronization operation for intra-cell D2D discovery will be described below.

D2D devices receive a synchronization signal, e.g., a primary synchronization signal (PSS) and/or a secondary synchronization signal (SSS) which is transmitted by a BS to perform a downlink synchronization operation with the BS. For convenience, a PSS and/or an SSS will be referred to as "PSS/SSS".

Further, D2D devices may perform an uplink synchronization operation with a BS for uplink data and control information transmission. The uplink synchronization operation is performed through an RA process, and each D2D device receives timing advance (TA) information from a serving BS of the D2D device in the uplink synchronization operation.

Upon receiving the TA information, the D2D device starts a TA timer, and maintains a TA value, which is received from a BS until the TA timer expires. That is, the D2D device which acquires the TA information from the BS uses a TA value indicated by the TA information upon transmitting control information and data through an uplink until the TA timer expires. If the TA timer expires, the D2D device performs an RA process again to update TA information.

Further, a D2D discovery signal is transmitted based on downlink reference time of a BS. The downlink reference time of the BS is applied to all of type 1 discovery and type 2 discovery. That is, a D2D device transmits a D2D discovery signal based on a time at which a PSS/SSS is received from a serving BS.

A resource allocating operation for intra-D2D discovery will be described below.

Firstly, a BS may transmit the following information through an SIB for supporting intra-cell D2D discovery.

(1) Discovery Type Information

The discovery type information denotes information on a type of D2D discovery which is supported by a cell which is managed by the BS, e.g., a type 1, a type 2, or both a type 1 and a type 2.

(2) Transmission Pool Information

The transmission pool information denotes information on a transmission pool. The transmission pool information may be applied to only type 1 discovery.

All D2D devices which support type 1 discovery within a cell receive transmission pool information from a BS. The transmission pool information may include information on how a transmission pool is configured, and the like. For example, the transmission pool information may include the number of sub-frames included in the transmission pool, the number of RBs included in a sub-frame, and the like.

The information on the transmission pool information, e.g., the information on how the transmission pool is configured may be expressed with various forms. For example, configuration of D2D sub-frames may be expressed with a bitmap form "1011100 . . . ". For example, "1" indicates a D2D sub-frame, and "0" indicates a cellular sub-frame. Information on the number of RBs included in a D2D sub-frame may include a start point and an end point of RBs on a frequency axis. A D2D device which supports the type 1 discovery selects a D2D transmission resource within a corresponding transmission pool based on the transmission pool information received from the BS, and transmits a D2D discovery signal through the selected D2D transmission resource.

(3) Reception Pool Information

The reception pool information includes information on a reception pool, and the reception pool information may be applied to both of type 1 discovery and type 2 discovery. All D2D devices within a cell receive reception pool information from a BS. The reception pool information may include information on how a reception pool is configured, and the like. For example, the reception pool information may include the number of sub-frames included in the reception pool, the number of RBs included in a sub-frame, and the like. All of the D2D devices within the cell monitor all RBs included in the reception pool and decode a D2D discovery signal.

A transmission pool may be a subset of a reception pool. That is, there may be a transmission pool including N sub-frames within a reception pool including M sub-frames, so M≥N.

A synchronization operation for inter-cell D2D discovery will be described below.

In a synchronous network, each BS synchronizes transmission time and reception time of each BS using a GPS. So, all BSs which are in the synchronous network have the same time synchronization.

In an asynchronous synchronous network, BSs do not have the same time synchronization. In this case, an inter-cell interference issue may be more serious compared to the synchronous network.

So, for addressing an inter-cell interference issue in an asynchronous network, a network synchronization operation is performed using an X2 interface between BSs or an S1 interface between a BS and an upper layer which is in a core network, e.g., a mobility management element (MME). At this time, various network synchronization protocols may be used.

However, even though a synchronization operation between BSs is performed using a network synchronization protocol, sub-frame level-synchronization accuracy between the BSs may not be provided. That is, there may be an error of ½ sub-frame from a sub-frame boundary of a cell-A on a sub-frame of a neighbor cell-B. For example, the sub-frame of the neighbor cell-B has an error which is 0.5 millisecond slower than the sub-frame boundary of the cell-A or which is 0.5 millisecond faster than the sub-frame boundary of the cell-A.

In type 1 discovery, a D2D device which is located at each cell transmits a D2D discovery signal based on downlink reference time of a serving BS. So, in an asynchronous network in which BSs which are in different cells do not the same synchronization, there is a need for a method for synchronizing D2D devices which are in different cells.

In the Rel-12 LTE, a D2D scheme does not use an X2 interface between BSs in order to support an inter-cell D2D operation. That is, a BS does not provide timing information of a neighbor cell to a D2D device which is in a serving cell using an X2 interface. So, a D2D synchronization signal (D2DSS) has been defined for performing a synchronization operation between D2D devices which are in different cells without timing information of a neighbor cell. That is, a D2D device which is in a cell-A transmits a D2DSS, and D2D devices which are in a neighbor cell may detect a sub-frame boundary of a resource region which is used for D2D discovery in the cell-A by receiving the D2DSS.

A resource allocating operation for inter-cell D2D discovery will be described below.

Firstly, a resource allocation scheme which is based on operation administration maintenance (OAM) has been considered for supporting a D2D operation between D2D devices which are in different cells without exchanging timing information of a neighbor cell through an X2 interface in an asynchronous network. That is, an upper entity, e.g., an MME acquires timing information of BSs which are managed by the MME, e.g., a system frame number (SFN) using an S1 interface, and each BS allocates a resource to be used for D2D discovery using the acquired timing information. For convenience, a resource to be used for D2D discovery will be referred to as "D2D discovery resource."

More specifically, a D2D discovery resource for a specific cell is allocated such that the D2D discovery resource is not overlapped with D2D discovery resources of other cells which are around the specific cell on a time axis. For example, if it is assumed that there are a cell-A, a cell-B, and a cell-C, a D2D resource pool of the cell-A is allocated during time T1, e.g., M1 sub-frames, a D2D resource pool of the cell-B is allocated during time T2, e.g., M2 sub-frames, and a D2D resource pool of the cell-C is allocated during time T3, e.g., M3 sub-frames. Each D2D resource pool may include D2D sub-frames which are successive, or D2D sub-frames which are not successive.

For example, if a D2D resource pool of the cell-A includes successive D2D sub-frames, all sub-frames included in a D2D resource pool which is allocated during time T1 become D2D sub-frames. That is, all of M1 sub-frames may be used as a resource for D2D communication.

Alternatively, if the D2D resource pool of the cell-A includes D2D sub-frames which are not successive, sub-frames for cellular communication and sub-frames for D2D communication may be multiplexed based on a time division multiplexing (TDM) scheme during time T1.

A serving cell may transmit resource allocation information of a neighbor cell(s) to devices through an SIB. That is, a serving BS which manages a serving cell informs information on a D2D resource pool which is used in the neighbor cell(s) as well as information on a D2D resource pool which will be used at the serving cell to devices within the serving cell.

Devices perform a D2D transmitting operation and a D2D receiving operation using resource allocation information of a neighbor cell(s) which is received from a serving BS.

The D2D transmitting operation may be performed based on a D2D transmission pool of a serving cell, or may be performed based on a specific time-frequency resource within a D2D reception pool of a serving cell under command of a BS. For type 1 discovery, the D2D transmitting operation is performed based on the D2D transmission pool of the serving cell. For type 2 discovery, the D2D transmitting operation is performed based on the specific time-frequency resource within the D2D reception pool of the serving cell under the command of the BS.

The D2D receiving operation is performed based on both of a D2D reception pool of a serving cell and D2D reception pools of neighbor cells. For example, in type 1 discovery, D2D transmitting devices, which are located at a cell-A, transmit a D2D discovery signal using a D2D transmission pool during time T1, and D2D receiving devices, which do not perform a D2D transmitting operation, monitor a D2D discovery signal through all RBs included in a D2D reception pool to decode the monitored D2D discovery signal. In both of the type 1 discovery and type 2 discovery, the D2D receiving devices monitor a D2D discovery signal through all RBs included in D2D reception pools which are used in a neighbor cell-B and a neighbor cell-C to decode the monitored D2D discovery signal.

In a D2D scheme in the Rel-12 LTE, a D2D transmitting device may transmit a D2D discovery signal only on a frequency band of a serving cell or a camped cell. Here, a serving cell denotes a cell in which a device, which is in an RRC connected mode, maintains a connection, and a camped cell denotes a cell on which a device, which is in an RRC idle mode, is camped.

The D2D transmitting device may transmit a D2D discovery signal, and receive a D2D discovery signal which is transmitted by another D2D transmitting device which maintains a connection with a neighbor cell or which is camped on the neighbor cell on a frequency band which is used by a non-serving cell or a cell on which the D2D transmitting device is not camped. For example, in a case in which a frequency band which is used by a serving cell or a camped cell is f1, and a frequency band which is used by a neighbor cell is f2, a D2D device which selects a cell which uses the frequency band f1 as a serving cell or a camped cell may transmit and receive a D2D signal on the frequency band f1, and may perform only an operation of receiving a D2D signal on the frequency band f2.

Similar to this, a D2D device which selects a cell which uses the frequency band f2 as a serving cell or a camped cell may transmit and receive a D2D signal on the frequency band f2, and may perform only an operation of receiving a D2D signal on the frequency band f1.

In a D2D communication procedure, unlike a D2D discovery procedure, if a frequency band which is provided by a serving cell or a camped cell is different from a frequency band which is provided by a neighbor cell, that is, if the frequency band which is provided by the serving cell or the camped cell is f1, and the frequency band which is provided by the neighbor cell is f2, a D2D transmitting device may perform a D2D transmitting operation on the frequency band which is provided by the neighbor cell. However, a use scenario thereof is very limited. For example, there may be a case in which a frequency band which is provided by a serving cell or a camped cell is limited to a commercial use, and a frequency band which is provided by a neighbor cell is limited to a PS use. At this time, a D2D transmitting device which is in an RRC idle mode moves a neighbor cell which uses a frequency band f2 through a cell re-selection process.

A D2D transmitting device which is in an RRC connected mode performs an inter-frequency handover operation in order to transmit D2D data and control information on a frequency band which is provided by a neighbor cell, and follows the following procedures in order to perform the inter-frequency handover operation.

1) A D2D device receives an SIB including resource pool information for D2D communication from a serving BS.

For example, the SIB may be an SIB 18 including public land mobile network (PLMN) identifiers (IDs) of neighbor cells which are considered in an RRC idle mode as well as an RRC connected mode. The resource pool information includes configuration information for sub-frames as time axis information and configuration information for RBs as frequency axis information. For example, the resource pool information may correspond to transmission pool information in a mode 2 communication, and may correspond to reception pool information in a mode 1 communication.

In view of a resource allocating scheme, mode 2 communication is similar to type 1 discovery, and mode 1 communication is similar to type 2 discovery. That is, a BS provides resource pool information to D2D devices within a cell through an SIB 18 in order to support the mode 2 communication. The resource pool information may include information on a size of a resource which is usable for the D2D discovery. For example, the information on the size of the resource which is usable for the D2D discovery may include the number of sub-frames which are resources on a time axis "x", information on y RBs which are resources on a frequency axis, and information on a resource allocation period. For example, the information on the y RBs may include a start point and an end point for the y RBs, or may include a start point for the y RBs and an offset, i.e., y. The resource allocation period denotes a period by which a resource at a time axis and a resource at a frequency axis are allocated. For example, the resource allocation period may be z seconds.

The resource pool information may include information on a resource pool for transmitting control information and information on a resource pool for transmitting D2D data separately. Each of D2D transmitting devices among D2D devices which receive the information on the resource pool for transmitting the control information and the information on the resource pool for transmitting the D2D data selects a resource to be used and transmits D2D data and control information through the selected resource. Here, resources which are selected by the D2D transmitting devices are distributed.

A D2D receiving device among the D2D devices which receive the information on the resource pool for transmitting the control information and the information on the resource pool for transmitting the D2D data uses the resource pool for transmitting the control information based on an SIB 18 to receive and decode control information transmitted from D2D transmitting devices. If the decoded control information includes an ID of the D2D receiving device, the D2D receiving device receives D2D data based on the control information. If the decoded control information does not include the ID of the D2D receiving device, the control information is discarded.

In mode 1 communication, a BS broadcasts information on a resource pool that D2D receiving devices need to monitor through an SIB 18 in order to receive a D2D discovery signal. A transmission resource, which is used for transmitting a D2D discovery signal for D2D transmitting devices, i.e., a D2D transmission resource, is scheduled by a BS. That is, the BS commands the D2D transmitting devices to transmit a D2D discovery signal through a specific time-frequency resource. The BS may perform a scheduling operation based on a semi-persistent scheme or a dynamic scheme, and a D2D transmitting device requests a D2D transmission resource by transmitting a signal such as an SR signal or a BSR signal to the BS.

For using mode 1 communication, a D2D device needs to be in an RRC connected mode. So, a D2D device which is in an RRC idle mode transits into an RRC connected mode through an RA procedure in order to request a D2D transmission resource.

A D2D device transmits an information element (IE) ProseUEInformation to a serving BS, where ProseUEInformation includes the following information.

(1) discRxInterest discRxInterest denotes information indicating whether the D2D device will receive a D2D discovery signal, and the serving BS which receives discRxInterest may know whether the D2D device will receive the D2D discovery signal.

(2) discTxResourceReq discTxResourceReq denotes information indicating that the D2D device requests a resource for transmitting a D2D discovery signal, and the serving BS which receives discTxResourceReq may know that the D2D device requests the resource for transmitting the D2D discovery signal.

(3) commRxInterestedFreq commRxInterestedFreq denotes information indicating a frequency on which the D2D device wants to receive data/control information for D2D communication, and the serving BS which receives commRxInterestedFreq may know the frequency on which the D2D device wants to receive the data/control information for the D2D communication.

(4) commTxResourceReq commTxResourceReq denotes information indicating that the D2D device requests a resource for transmitting data/control information for D2D communication, and the serving BS which receives commTxResourceReq may know that the D2D device requests the resource for transmitting the data/control information for the D2D communication. Here, commTxResourceReq may include carrierFreq indicating a frequency for transmission and proseDestinationInfoList indicating information of the D2D device which receives data/control information.

2) The serving BS transmits a radio resource management (RRM) measurement command for inter-frequency handover to the D2D device.

The RRM measurement command includes measurement time and a measurement period.

3) The D2D device performs a measuring operation, and transmits the measured result to the serving BS.

4) The serving BS determines whether the D2D device needs to perform an inter-frequency handover operation based on the measured result received from the D2D device. This will be described below.

If the determined result which is reported by the D2D device is greater than a specific threshold value determined in the serving BS, the serving BS determines that a signal of a neighbor cell which uses a frequency band f2 may provide a quality which is better than a preset quality. Thus, the serving BS determines that the D2D device needs to perform an inter-frequency handover operation, so the D2D device performs the inter-frequency handover operation. After performing the inter-frequency handover operation, the D2D device may transmit D2D data/control information on the frequency band f2.

Alternatively, if the determined result which is reported by the D2D device is not greater than the specific threshold value, that is, if the determined result which is reported by the D2D device is less than or equal to the specific threshold value, the serving BS may determine that the D2D needs not to perform the inter-frequency handover. Even though the determined result which is reported by the D2D device is greater than the specific threshold value, and the serving BS determines that the D2D device needs to perform the inter-frequency handover operation, there may be a case in which the D2D device fails in performing the inter-frequency handover operation. In this case, if the D2D device is able to acquire information on a mode 2 resource pool of a neighbor cell which uses a frequency band f2, the D2D device may transmit data/control information based on the mode 2 resource pool of the neighbor cell.

In an embodiment of the present disclosure, information on a mode 2 resource pool may include the number of sub-frames which are resources on a time axis "x", information on y RBs which are resources on a frequency axis, and information on a resource allocation period. For example, the information on the y RBs may include a start point and an end point for the y RBs, or may include a start point for the y RBs and an offset, i.e., y. The resource allocation period denotes a period by which a resource at a time axis and a resource at a frequency axis are allocated. For example, the resource allocation period may be z seconds.

Further, the information on the mode 2 resource pool may include information on a resource pool necessary for transmitting control information, e.g., lengths on a time axis and a frequency axis, a resource allocation period, and the like, and information on a resource pool necessary for transmitting data information, e.g., lengths on a time axis and a frequency axis, a resource allocation period, and the like, separately. For example, the information on the resource pool necessary for transmitting the control information may include the number of sub-frames x1, the number of RBs y1, and a resource allocation period z1, and the information on the resource pool necessary for transmitting the data information may include the number of sub-frames x2, the number of RBs y2, and a resource allocation period z2. The information on the resource pool necessary for transmitting the control information and the information on the resource pool necessary for transmitting the data information may be transmitted through an SIB.

As described above, in a D2D discovery procedure or a D2D communication procedure in the Rel-12 LTE, a D2D signal may be transmitted only on a serving carrier, and a D2D transmitting device which intends to transmit a D2D signal on a non-serving carrier needs to perform a handover operation to the serving carrier.

The D2D transmitting device controls transmission power for a transmitted D2D discovery signal thereby the transmitted D2D discovery signal does not affect reception of a physical uplink control channel (PUCCH) signal or a physical uplink shared channel (PUSCH) from a BS. That is, a D2D transmitting device which transmits a D2D discovery signal on a serving carrier may acquire parameters related to D2D transmission power through an SIB which is transmitted by a serving BS or a camped BS. For convenience, a parameter related to D2D transmission power will be referred to as "D2D transmission power parameter". For example, the SIB may be an SIB 19 including an inter-radio access technology (RAT) frequency and a priority which are used in a cell. That is, a BS transmits D2D transmission power parameters to D2D devices which are within a cell through an SIB 19. The D2D transmission power parameters which may be included in the SIB 19 may include a maximum transmission power value according to a D2D discovery range (power) class and parameters for D2D transmission power control. Each of the maximum transmission power value according to the D2D discovery range (power) class and the parameters for the D2D transmission power control will be described below.

A. Maximum Transmission Power Value According to a D2D Discovery Range (Power) Class Firstly, an SIB 19 may include discTxPowerInfo, which includes ProseDiscTxPowerinfoList and discMaxTxPower. Here, ProseDiscTxPowerinfoList denotes the number of D2D discovery power classes which are supported in a cell, and discMaxTxPower denotes maximum transmission power which may be used in each D2D discovery power class. For example, the maximum number of D2D discovery power classes which are supported in the cell may be 3. For example, if the number of D2D discovery power classes which are supported in a cell is 3, that is, if ProseDiscTx-PowerinfoList is 3, discMaxTxPower may include PLong, PMedium, and PShort. Here, PLong denotes transmission power which may support long range-D2D discovery, PMedium denotes transmission power which may support medium range-D2D discovery, and PShort denotes transmission power which may support short range-D2D discovery. Here, a long range denotes a range which is greater than the first range, a medium range denotes a range which is less than or equal to the first range and which is greater than the second range, and a short range denotes a range which is less than or equal to the second range. Further, PLong, PMedium, and PShort may be differently set per D2D discovery resource pool which is allocated by a BS, and the same D2D discovery power class is used for the same D2D discovery resource pool.

For example, if the number of D2D discovery resource pools which may be supported in one cell is 4, discMaxTx-Power which may be used for a D2D discovery resource pool 1 is PLong, discMaxTxPower which may be used for a D2D discovery resource pool 2 is PMedium, discMaxTx-Power which may be used for a D2D discovery resource pool 3 is PShort, and discMaxTxPower which may be used for a D2D discovery resource pool 4 is PLong. So, D2D transmitting devices which transmit a D2D discovery signal using the D2D discovery resource pool 1 use PLong as discMaxTxPower, D2D transmitting devices which transmit a D2D discovery signal using the D2D discovery resource pool 2 use PMedium as discMaxTxPower, D2D transmitting devices which transmit a D2D discovery signal using the D2D discovery resource pool 3 use PShort as discMaxTx-Power, and D2D transmitting devices which transmit a D2D discovery signal using the D2D discovery resource pool 4 use PLong as discMaxTxPower.

B. Parameters for Controlling D2D Discovery Transmission Power

Firstly, an SIB 19 may include ProseDiscPoolList4. The ProseDiscPoolList4 denotes transmission pool information for transmitting a discovery signal, and includes information on tx-parameters. The tx-parameters include a Prose-TxParameters Information Element which may include α and P0 as parameters for controlling transmission power.

For example, a D2D transmitting device which is located at a serving cell or a camped cell determines D2D transmission power on a serving carrier PServing_carrier using a D2D discovery power class received through an SIB 19 and transmission power control parameters α and P0 as expressed in Equation (1). For convenience, a D2D discovery power class will be referred to as "D2D discovery range class", and the D2D discovery range class is expressed as "PRange Class". Further, PRange Class∈{PLong, PMedium, PShort}.

$$P_{\text{Serving\_carrier}} = \min\{P_{\text{Power\_Control}}, P_{\text{Range\_Class}}\} \quad \text{Equation (1)}$$

That is, the D2D transmitting device determines the D2D transmission power on the serving carrier PServing_carrier as a minimum value of PPower Control and PRange Class. In Equation (1), PPower Control may be expressed as Equation (2).

$$P_{\text{Power\_Control}} = \min\{P0 + \alpha \cdot PL + 10 \cdot \log 10(M), P_{\text{UE\_Class}}\} \quad \text{Equation (2)}$$

In Equation (2), M denotes the number of RBs used for transmitting a D2D discovery signal. For example, in D2D discovery in the Rel-12 LTE, M is set to 2 (M=2). In Equation (2), PL denotes path loss between a BS and a UE, i.e., a D2D transmitting device, and the D2D transmitting device predicts the PL using transmission power of a reference signal (RS) which is transmitted by the BS and reference signal received power (RSRP) which is measured for the RS in the D2D transmitting device. That is, the D2D transmitting device estimates the PL using difference between referenceSignalPower as RS transmission power which is provided from the BS through RRC signaling and received power which is measured for the RS in the D2D transmitting device. In Equation (2), PUE_Class denotes a maximum transmission power value which is determined according to a D2D discovery range class of the UE, i.e., the D2D transmitting device. For example, the PUE_Class may be set to 23 dBm or 31 dBm.

As described above, in a case in which a D2D transmitting operation may be performed on only a serving carrier as a frequency which is provided by a serving cell or a camped cell, and only a D2D receiving operation may be performed on a non-serving carrier as a frequency which is provided by a neighbor cell, the following issues may occur.

In one scenario, a network operator does not allow a D2D discovery transmitting operation and allow a D2D discovery monitoring operation, i.e., a D2D discovery receiving operation at a specific cell. In this case, a D2D transmitting device needs to perform a D2D discovery transmitting operation at a non-serving carrier.

In another scenario, a D2D discovery operation may be used for PS use and commercial use. If a serving carrier is a frequency band which is allocated for commercial use, and a non-serving carrier is a frequency band which is allocated for PS use, a D2D transmitting device, which intends to perform a D2D discovery transmitting operation for PS use, needs to perform the D2D discovery transmitting operation at a non-serving carrier.

In another scenario, in a case in which a D2D discovery operation may perform a transmitting operation and a receiving operation on different frequencies at the same time, a D2D transmitting device needs to perform a transmitting operation for a D2D discovery signal on a non-serving carrier while performing a cellular uplink transmitting operation on a serving carrier.

Further, a D2D transmitting device needs to perform a D2D discovery transmitting operation on a non-serving carrier in additional scenarios (not described here).

An embodiment of the present disclosure provides a scheme for acquiring transmission power parameters for transmitting a D2D discovery signal on a non-serving carrier and a scheme for determining D2D transmission power for transmitting the D2D discovery signal on the non-serving carrier.

The scheme for acquiring the transmission power parameters for transmitting the D2D discovery signal on the non-serving carrier may be classified into a scheme in which a serving cell or a camped cell of a D2D transmitting device provides transmission power parameters for a non-serving carrier, and a scheme in which a neighbor cell which provides the non-serving carrier directly provides the transmission power parameters.

The scheme for determining the D2D transmission power for transmitting the D2D discovery signal on the non-serving carrier may be classified into a scheme which is based on RSRP for a serving BS which provides a serving carrier and a scheme which is based on RSRP for a neighbor BS which provides a non-serving carrier.

Various embodiments for acquiring a D2D transmission power parameter for transmitting a D2D discovery signal on a non-serving carrier will be described below.

Firstly, various embodiments of the present disclosure for providing D2D transmission power parameters for a non-serving carrier in a serving cell or a camped cell will be described below.

In an embodiment of the present disclosure, an SIB 19 which is broadcasted in a serving cell or a camped cell includes D2D transmission power parameters which are used on a non-serving carrier.

For example, it will be assumed that a cell-A is a serving cell which provides a serving carrier, and a cell-B is a neighbor cell which provides a non-serving carrier. A BS which manages the cell-A broadcasts at least one of P0,A, αA, and PRange_Class,A as D2D transmission power parameters for D2D discovery to all D2D devices which are within a cell(s) which is managed by the BS through an SIB 19.

Further, a BS which manages the cell-B broadcasts at least one of P0,B, αB, and PRange_Class,B to all D2D devices within a cell(s) which is managed by the BS through an SIB.

For example, the BS which manages the cell-A broadcasts the at least one of the P0,B, αB, and PRange_Class,B of the cell-B through the SIB 19 thereby a D2D device which maintains a connection with the cell-A may perform a D2D transmitting operation on the non-serving carrier of the cell-B. For this, the BS which manages the cell-A acquires D2D transmission power parameters for the cell-B from the BS which manages the cell-B through an X2 interface.

For another example, the BS which manages the cell-A may acquire the D2D transmission power parameters for the cell-B from a network entity, e.g., an MME through an S1 interface as an interface between the MME and each BS.

For another example, the BS which manages the cell-A may acquire the D2D transmission power parameters for the cell-B from an arbitrary logical entity through an interface which is newly defined between the logical entity and each BS. At this time, the logical entity may be an entity which is defined for supporting a D2D discovery transmitting operation on a non-serving carrier, not a BS or an MME.

D2D transmission power parameters for a serving carrier instead of D2D transmission power parameters for a non-serving carrier may be applied to a D2D discovery transmitting operation on the non-serving carrier.

A D2D transmitting device, which maintains a connection with the cell-A or which is camped on the cell-A, transmits a D2D discovery signal through a non-serving carrier of the cell-B using D2D transmission power parameters which are provided through an SIB 19 for the cell-A. That is, the D2D transmitting device uses at least one of P0,A, αA, and PRange_Class,A which are acquired from the cell-A, not at least one of P0,B, αB, and PRange_Class,B upon transmitting a D2D discovery signal at the non-serving carrier of the cell-B.

At this time, there may be various changes. As described above, all of the three parameters used in a serving cell or a camped cell of the D2D transmitting device may be used for transmitting a D2D discovery signal on a non-serving carrier, or a part of the three parameters may be used for transmitting the D2D discovery signal on the non-serving carrier. For example, the D2D transmitting device may determine D2D transmission power on the non-serving carrier using P0,A, αA, and PRange_Class,B. In this case, a BS which manages the cell-A acquires information on PRange_Class,B of the cell-B through an X2 interface, an S1 interface, or another interface, and transmits PRange_Class,B, P0,A, and αA as D2D transmission power parameters for a non-serving carrier through an SIB 19 for the cell-A.

Various embodiments of the present disclosure for providing D2D transmission power parameters in a neighbor cell which provides a non-serving carrier will be described below.

A D2D transmitting device which is located at a serving cell or a camped cell acquires D2D transmission power parameters for D2D discovery transmission which are used in a neighbor cell by receiving and decoding an SIB 19 which is transmitted by a BS which manages the neighbor cell.

In an embodiment of the present disclosure, a D2D transmitting device, which is located at a serving cell or a camped cell, receives an SIB 19 broadcasted by a neighbor cell only in a case in which the D2D transmitting device transits from an RRC idle mode or an RRC connected mode into a discontinuous reception (DRX) mode. The DRX mode denotes a status in which a reception circuit included in a D2D transmitting device is tuned to a frequency of a neighbor cell instead of a frequency of a serving cell or a camped cell. In another embodiment of the present disclosure, a D2D transmitting device which is located at a serving cell or a camped cell and is in an RRC connected mode may request D2D discovery transmission on a non-serving carrier to a serving BS. The serving BS commands the D2D transmitting device to receive an SIB 19 of a neighbor cell in response to the request of the D2D transmitting device, or according to determination of the serving BS without request of the D2D transmitting device, and the D2D transmitting device receives the SIB 19 of the neighbor cell in response to the command of the serving BS.

A D2D transmitting device which acquires D2D transmission power parameters for D2D discovery transmission using the described schemes determines transmission power of a D2D discovery signal using a PL value which is calculated by the D2D transmitting device and the acquired D2D transmission power parameters. At this time, the calculation of the PL value may be performed based on received power of an RS, which is transmitted by a BS of a serving cell or a camped cell, e.g., RSRP for a serving carrier, or received power of an RS, which is transmitted by a BS of a neighbor cell which provides a non-serving carrier, e.g., RSRP for the non-serving carrier.

A scheme for calculating PL based on RSRP for a serving carrier will be described below.

A D2D transmitting device may determine D2D transmission power for transmitting a D2D discovery signal on a non-serving carrier based on PL which is calculated based on RSRP measured for a serving cell which provides a serving carrier or a camped cell and D2D transmission power parameters which are acquired through an SIB. At this time, the D2D transmitting device may determine the D2D transmission power for transmitting the D2D discovery signal on the non-serving carrier based on at least one of D2D transmission power parameters for the non-serving carrier which are acquired based on an SIB 19 which is broadcasted by a serving BS which provides a serving carrier or a BS which manages a camped cell, e.g., P0,B, αB, and PRange_Class,B. Alternatively, the D2D transmitting device may determine the D2D transmission power for transmitting the D2D discovery signal on the non-serving carrier based on at least one of D2D transmission power parameters for a serving carrier which is used in a serving BS or a BS which manages a camped cell, e.g., P0,A, αA, and PRange_Class,A.

If D2D transmission power parameters for a non-serving carrier are provided through an SIB 19 of a serving BS or a BS which manages a camped cell, D2D discovery transmission power PNon-Serving_carrier for transmitting a D2D discovery signal on the non-serving carrier may be expressed as Equation (3) and Equation (4).

$$P\text{Non-Serving\_carrier} = \min\{P\text{Power\_Control},B, P\text{Range\_Class},B\} \quad \text{Equation (3)}$$

$$P\text{Power\_Control},B = \min\{P0,B + \alpha B \cdot PLA + 10 \cdot \log 10(M), PUE\_\text{Class}\} \quad \text{Equation (4)}$$

In Equation (4), PLA denotes PL which is calculated based on RSRP between a BS which manages a cell-A which provides a serving carrier and a D2D transmitting device, and referenceSignalPower which is provided by the BS which manages the cell-A through RRC signaling.

If D2D transmission power parameters for a serving BS are used, D2D discovery transmission power PNon-Serving_carrier for transmitting a D2D discovery signal on a non-serving carrier may be expressed as Equation (5) and Equation (6).

$$P\text{Non-Serving\_carrier} = \min\{P\text{Power\_Control},A, P\text{Range\_Class},A\} \quad \text{Equation (5)}$$

$$P\text{Power\_Control},A = \min\{P0,A + \alpha A \cdot PLA + 10 \cdot \log 10(M), PUE\_\text{Class}\} \quad \text{Equation (6)}$$

A D2D discovery range class may be PRange_Class,A as a D2D transmission power parameter which is acquired from the BS which manages the cell-A as expressed in Equation (5), or PRange_Class,B as a D2D transmission power parameter of the cell-B which is acquired through an SIB 19 which is broadcasted by the BS which manages the cell-A.

A scheme for calculating PL based on RSRP for a non-serving carrier will be described below.

Firstly, a D2D transmitting device may determine D2D transmission power for transmitting a D2D discovery signal on a non-serving carrier based on PL which is calculated based on RSRP measured from a neighbor cell which provides a non-serving carrier and D2D transmission power parameters. At this time, the D2D transmitting device may determine the D2D transmission power for transmitting the D2D discovery signal on the non-serving carrier based on D2D transmission power parameters, e.g., P0,B, αB, and PRange_Class,B of the non-serving carrier which are acquired through an SIB broadcasted by a serving BS which provides a serving carrier or a BS which manages a camped cell. Alternatively, the D2D transmitting device may determine the D2D transmission power for transmitting the D2D discovery signal on the non-serving carrier based on D2D transmission power parameters, e.g., P0,A, αA, and PRange_Class,A of a serving carrier which is used in a serving BS or a BS which manages a camped cell.

If D2D transmission power parameters for a non-serving carrier are provided through an SIB 19 broadcasted from a serving BS or a BS which manages a camped cell, D2D discovery transmission power PNon-Serving carrier for transmitting a D2D discovery signal on the non-serving carrier may be expressed as Equation (7) and Equation (8).

$$P\text{Non-Serving\_carrier} = \min\{P\text{Power\_Control},B, P\text{Range\_Class},B\} \quad \text{Equation (7)}$$

$$P\text{Power\_Control},B = \min\{P0,B + \alpha B \cdot PLB + 10 \cdot \log 10(M), PUE\_\text{Class}\} \quad \text{Equation (8)}$$

In Equation (8), PLB denotes PL, which is calculated based on RSRP between a BS which manages a cell-B which provides a non-serving carrier and a D2D transmitting device, and referenceSignalPower of the BS, which manages the cell-B which a BS which manages a cell-A acquires through an X2 interface, an S1 interface, or another interface and provides to the D2D transmitting device through RRC signaling.

If D2D transmission power parameters for a serving BS are used, D2D discovery transmission power PNon-Serving_carrier for transmitting a D2D discovery signal on a non-serving carrier may be expressed as Equation (9) and Equation (10).

$$P\text{Non-Serving\_carrier} = \min\{P\text{Power\_Control},A, P\text{Range\_Class},A\} \quad \text{Equation (9)}$$

$$P\text{Power\_Control},A = \min\{P0,A + \alpha A \cdot PLB + 10 \cdot \log 10(M), PUE\_\text{Class}\} \quad \text{Equation (10)}$$

A D2D discovery range class may be PRange_Class,A as a D2D transmission power parameter which is acquired from the BS which manages the cell-A as expressed in Equation (9), or PRange_Class,B as a D2D transmission power parameter of the cell-B which is acquired through an SIB 19 which is broadcasted by the BS which manages the cell-A.

A case in which D2D transmission power parameters are used for a D2D discovery procedure has been described above. However, it will be understood by those of ordinary skill in the art that the same D2D transmission power parameters or other D2D transmission power parameters which are acquired through a similar procedure may be used for a D2D communication procedure, i.e., for transmitting D2D data.

Further, Equations (3) to (10) may be changed, and this will be described below.

For example, PRange_Class,B in Equation (3) or Equation (7) may be replaced with PRange_Class,A which is used in a cell-A. For another example, PRange_Class,A in Equation (5) or Equation (9) may be replaced with PRange_Class,B which is used in a cell-B.

An example of a process for providing D2D transmission power parameters in a communication system supporting a D2D scheme according to an embodiment of the present disclosure will be described with reference to FIG. 2.

Figure 2:
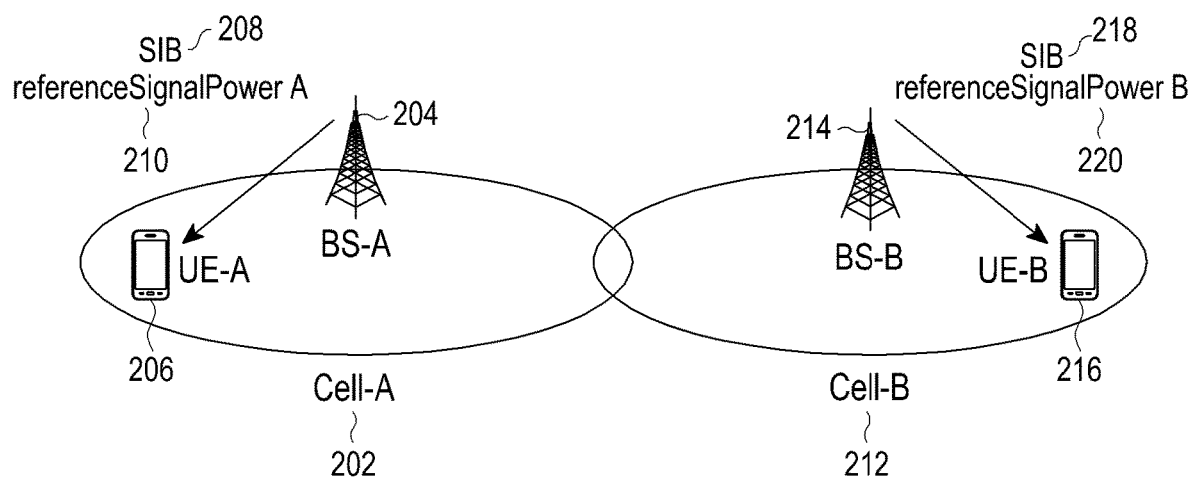
FIG. 2 schematically illustrates an example of a process for providing D2D transmission power parameters in a communication system supporting a D2D scheme according to an embodiment of the present disclosure.

FIG. 2 schematically illustrates an example of a process for providing D2D transmission power parameters in a communication system supporting a D2D scheme according to an embodiment of the present disclosure.

Referring to FIG. 2, a cell-A 202 is managed by a BS-A 204, and a device, e.g., a UE-A 206 maintains a connection with the BS-A 204, that is, the UE-A 206 is in an RRC connected mode, or the UE-A 206 is camped within the cell-A 202, that is, the UE-A 206 is in an RRC idle mode.

A cell-B 212 is managed by a BS-B 214, and a device, e.g., a UE-B 216 maintains a connection with the BS-B 214, that is, the UE-B 216 is in an RRC connected mode, or the UE-B 216 is camped within the cell-B 212, that is, the UE-B 216 is in an RRC idle mode.

Each of the BS-A 204 and the BS-B 214 transmits D2D transmission power parameters for D2D transmission to D2D devices, i.e., the UE-A 206 and the UE-B 216, which maintain a connection with a cell, i.e., the cell-A 202 and the cell-B 204, which is managed by each of the BS-A 204 and the BS-B 214 through SIBs 208 and 218, e.g., an SIB 19. In an embodiment of the present disclosure, the D2D transmission power parameters includes at least one of P0, α, and PRange_Class.

Each of the BS-A 204 and the BS-B 214 transmits referenceSignalPower as a parameter indicating transmission power of an RS through RRC signaling 210 and 220 thereby the referenceSignalPower may be used for calculating PL necessary for determining transmission power.

Further, the BS-A 204 transmits D2D transmission power parameters to the UE-A 206 within the cell-A 202 through the SIB 19-A 208, and transmits referenceSignalPower-A as RS transmission power of the BS-A 204 to the UE-A 206 through RRC signaling 210, i.e., the SIB 19-A 210. Here, the SIB 19-A 208 denotes an SIB 19 which is transmitted by the BS-A 204, the SIB 2-A 210 denotes an SIB 2 which is transmitted by the BS-A 204, and referenceSignalPower-A denotes referenceSignalPower which is transmitted by the BS-A 204.

Further, the BS-B 214 transmits D2D transmission power parameters to the UE-B 216 within the cell-B 212 through the SIB 19-B 218, and transmits referenceSignalPower-B as RS transmission power of the BS-B 214 to the UE-B 216 through RRC signaling 220, i.e., the SIB 19-B 210. Here, the SIB 19-B 218 denotes an SIB 19 which is transmitted by the BS-B 214, the SIB 2-B 210 denotes an SIB 2 which is transmitted by the BS-B 214, and referenceSignalPower-B denotes RS transmission power which is transmitted by the BS-B 214.

The UE-A 206 calculates transmission power which is used for transmitting a D2D discovery signal through a serving carrier of the cell-A 202 based on the D2D transmission power parameters which are acquired through the SIB 19-A 208, the referenceSignalPower-A which is acquired through the RRC signaling 210, i.e., the SIB 2-A 210, and the RSRP for the BS-A 204 which is measured by the UE-A 206.

The UE-B 216 calculates transmission power, which is used for transmitting a D2D discovery signal through a serving carrier of the cell-B 212, based on the D2D transmission power parameters which are acquired through the SIB 19-B 218, the referenceSignalPower-B which is acquired through the RRC signaling 220, i.e., the SIB 2-B 220, and the RSRP for the BS-B 214 which is measured by the UE-B 216.

Each of the UE-A 206 and the UE-B 216 may transmit a D2D discovery signal using the calculated transmission power through a resource which is allocated for D2D discovery.

An example of a process for providing D2D transmission power parameters in a communication system supporting a D2D scheme according to an embodiment of the present disclosure has been described with reference to FIG. 2. An example of a process for providing D2D transmission power parameters for a non-serving carrier in a serving cell in a communication system supporting a D2D scheme according to an embodiment of the present disclosure will be described with reference to FIG. 3A.

Figure 3A:
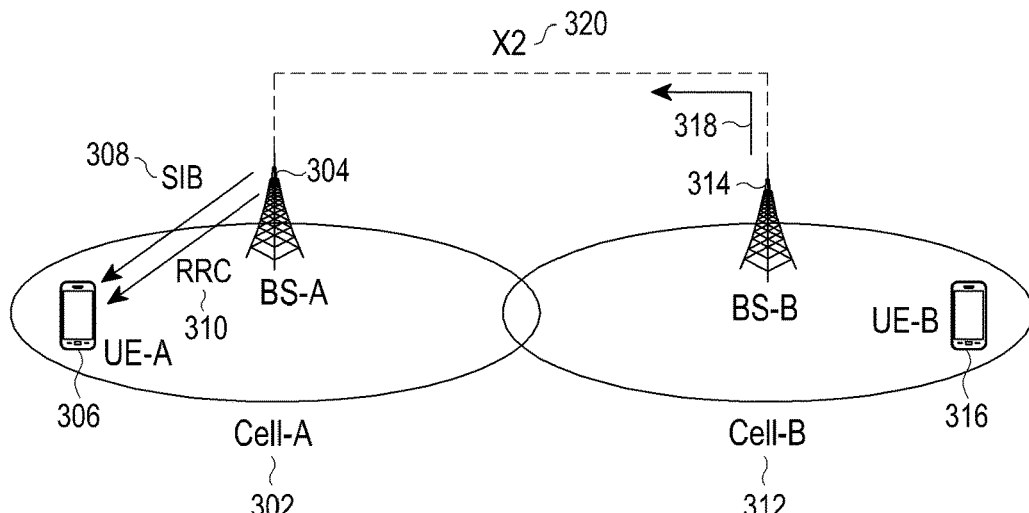
FIG. 3A schematically illustrates an example of a process for providing D2D transmission power parameters for a non-serving carrier in a serving cell in a communication system supporting a D2D scheme according to an embodiment of the present disclosure.

FIG. 3A schematically illustrates an example of a process for providing D2D transmission power parameters for a non-serving carrier in a serving cell in a communication system supporting a D2D scheme according to an embodiment of the present disclosure.

Referring to FIG. 3A, a cell-A 302 is managed by a BS-A 304, and a device, e.g., a UE-A 306 maintains a connection with the BS-A 304, that is, the UE-A 306 is in an RRC connected mode, or the UE-A 306 is camped within the cell-A 302, that is, the UE-A 306 is in an RRC idle mode.

A cell-B 312 is managed by a BS-B 314, and a device, e.g., a UE-B 316 maintains a connection with the BS-B 314, that is, the UE-B 316 is in an RRC connected mode, or the UE-B 316 is camped within the cell-B 312, that is, the UE-B 316 is in an RRC idle mode.

A case in which the UE-A 306, which maintains the connection with the BS-A 304 which manages the cell-A 302 or which is camped within the cell-A 302, performs a D2D transmitting operation on a non-serving carrier which is provided by the BS-B 314 which manages the cell-B 312 will be described below.

The BS-A 304 acquires D2D transmission power parameters 318, e.g., P0,B, αB, and PRange_Class,B for the cell-B 312 through an X2 interface 320, and transmits the D2D transmission power parameters 318 to the UE-A 306 within the cell-A 302 through the SIB-A 308. In a case in which the UE-A 306 calculates PL based on RSRP for the BS-B 314, the BS-A 304 acquires referenceSignalPower-B as RS transmission power of the BS-B 314 which is used in the cell-B 312 through the X2 interface 320, and provides the acquired referenceSignalPower-B to the UE-A 302 through the RRC signaling 310.

An example of a process for providing D2D transmission power parameters for a non-serving carrier in a serving cell in a communication system supporting a D2D scheme according to an embodiment of the present disclosure has been described with reference to FIG. 3A, and another example of a process for providing D2D transmission power parameters for a non-serving carrier in a serving cell in a communication system supporting a D2D scheme according to an embodiment of the present disclosure will be described with reference to FIG. 3B.

Figure 3B:
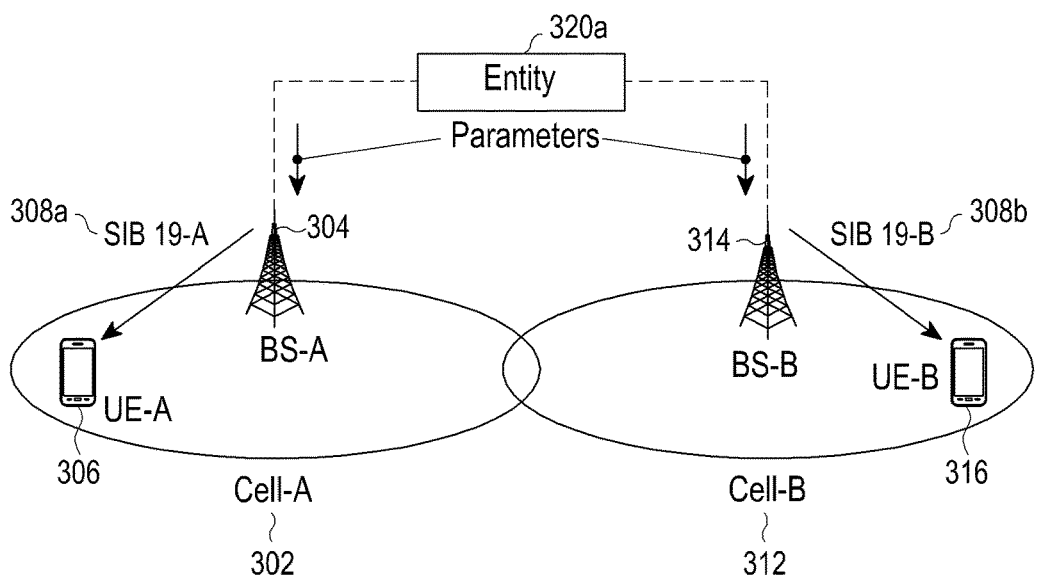
FIG. 3B schematically illustrates another example of a process for providing D2D transmission power parameters for a non-serving carrier in a serving cell in a communication system supporting a D2D scheme according to an embodiment of the present disclosure.

FIG. 3B schematically illustrates another example of a process for providing D2D transmission power parameters for a non-serving carrier in a serving cell in a communication system supporting a D2D scheme according to an embodiment of the present disclosure.

Referring to FIG. 3B, a cell-A 302 is managed by a BS-A 304, and a device, e.g., a UE-A 306 maintains a connection with the BS-A 304, that is, the UE-A 306 is in an RRC connected mode, or the UE-A 306 is camped within the cell-A 302, that is, the UE-A 306 is in an RRC idle mode.

A cell-B 312 is managed by a BS-B 314, and a device, e.g., a UE-B 316 maintains a connection with the BS-B 314, that is, the UE-B 316 is in an RRC connected mode, or the UE-B 316 is camped within the cell-B 312, that is, the UE-B 316 is in an RRC idle mode.

A case in which the UE-A 306, which maintains the connection with the BS-A 304 which manages the cell-A 302 or which is camped within the cell-A 302, performs a D2D transmitting operation on a non-serving carrier which is provided by the BS-B 314 which manages the cell-B 312 will be described below.

The BS-A 304 acquires at least one of D2D transmission power parameters, e.g., P0,B, αB, PRange_Class,B for the cell-B 312 through an S1 interface or an additional interface 320a, and transmits the D2D transmission power parameters to the UE-A 306 within the cell-A 302 through an SIB-A 308a.

The BS-B 314 acquires at least one of D2D transmission power parameters, e.g., P0,B, αB, PRange_Class,B for the cell-A 302 through an S1 interface or an additional interface 320a, and transmits the D2D transmission power parameters to the UE-B 316 within the cell-B 312 through an SIB-A 308b.

In a case in which the UE-A 306 calculates PL based on RSRP for the BS-B 314, the BS-A 304 acquires referenceSignalPower-B as RS transmission power of the BS-B 314 which is used in the cell-B 312 through the S1 interface or the additional interface 320a, and may provide the acquired referenceSignalPower-B to the UE-A 302 through RRC signaling.

Another example of a process for providing D2D transmission power parameters for a non-serving carrier in a serving cell in a communication system supporting a D2D scheme according to an embodiment of the present disclosure has been described with reference to FIG. 3B, and an example of a process for providing D2D transmission power parameters for a non-serving carrier in a neighbor cell in a communication system supporting a D2D scheme according to an embodiment of the present disclosure will be described with reference to FIG. 3C.

Figure 3C:
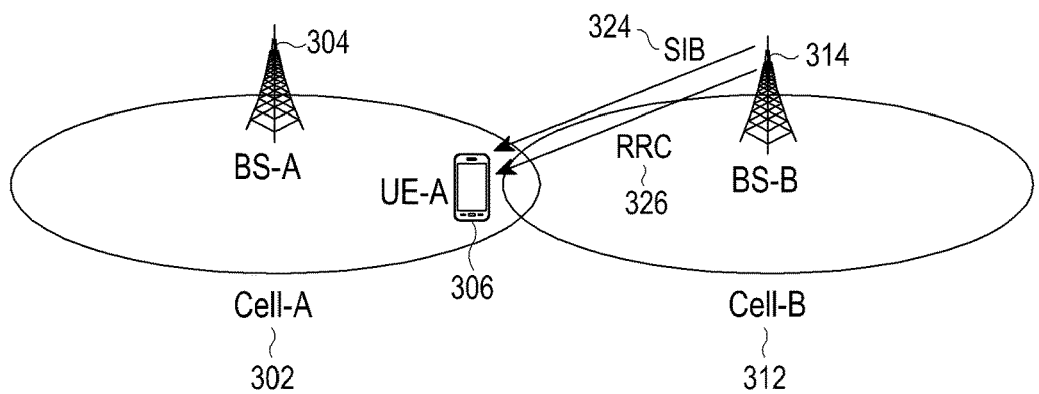
FIG. 3C schematically illustrates an example of a process for providing D2D transmission power parameters for a non-serving carrier in a neighbor cell in a communication system supporting a D2D scheme according to an embodiment of the present disclosure.

FIG. 3C schematically illustrates an example of a process for providing D2D transmission power parameters for a non-serving carrier in a neighbor cell in a communication system supporting a D2D scheme according to an embodiment of the present disclosure.

Referring to FIG. 3C, a cell-A 302 is managed by a BS-A 304, and a device, e.g., a UE-A 306 maintains a connection with the BS-A 304, that is, the UE-A 306 is in an RRC connected mode, or the UE-A 306 is camped within the cell-A 302, that is, the UE-A 306 is in an RRC idle mode.

The cell-B 312 is managed by the BS-B 314, and is adjacent to the cell-A 302. Similar to FIG. 3A, the BS-B 314 transmits SIB-B 324 including D2D transmission power parameters for D2D devices within the cell-B 312, and RRC signaling 326 including information on RS transmission power.

The UE-A 306 within the cell-A 302 receives the SIB-B 324 which is transmitted by the BS-B 314 and acquires D2D transmission power parameters for D2D discovery transmission, e.g., P0,B, αB, and PRange_Class,B from the SIB-B 324 in order to transmit a D2D discovery signal on a non-serving carrier which is used at the cell-B 312.

The UE-A 306 acquires referenceSignalPower-B as RS transmission power which is used in the cell-B 312 through RRC signaling 326 from the BS-B 314, e.g., an SIB 2 326, and calculates PL based on the acquired referenceSignalPower-B and RSRP which is measured for the BS-B 314. The UE-A 306 determines transmission power which will be used for transmitting a D2D discovery signal based on the calculated PL and the D2D transmission power parameters acquired from the SIB-B 324.

An example of a process for providing D2D transmission power parameters for a non-serving carrier in a neighbor cell in a communication system supporting a D2D scheme according to an embodiment of the present disclosure has been described with reference to FIG. 3C, and an example of a D2D transmitting operation on a non-serving carrier in a D2D device in a communication system supporting a D2D scheme according to an embodiment of the present disclosure will be described with reference to FIG. 4.

Figure 4:
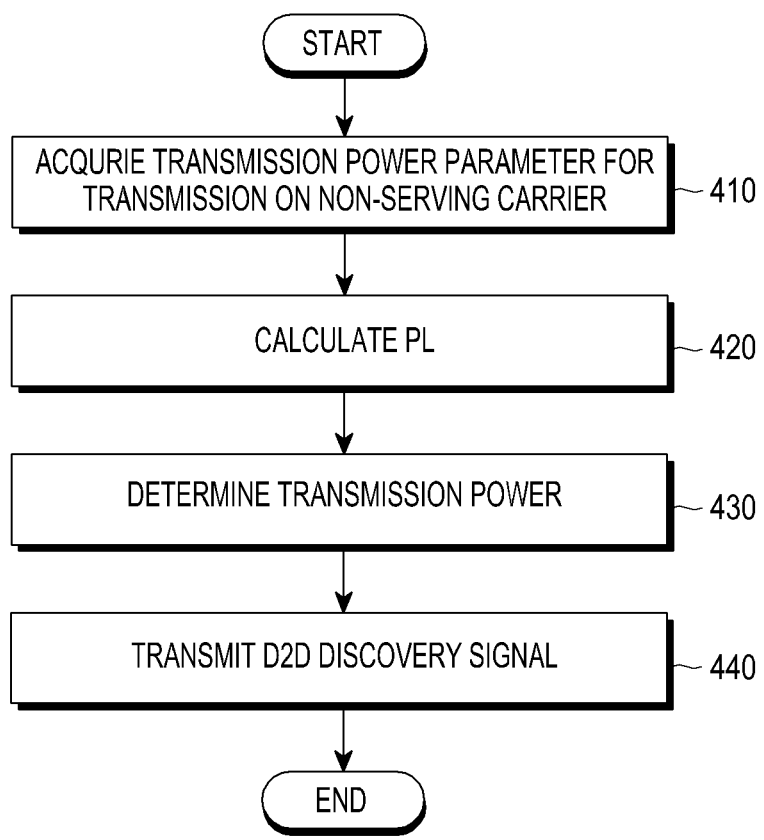
FIG. 4 schematically illustrates an example of a D2D transmitting operation on a non-serving carrier in a D2D device in a communication system supporting a D2D scheme according to an embodiment of the present disclosure.

FIG. 4 schematically illustrates an example of a D2D transmitting operation on a non-serving carrier in a D2D device in a communication system supporting a D2D scheme according to an embodiment of the present disclosure.

Referring to FIG. 4, a D2D device acquires D2D transmission power parameters for D2D transmission on a non-serving carrier by receiving system information which is transmitted from a serving BS, or acquires D2D transmission power parameters for D2D transmission on a non-serving carrier by directly receiving system information which is transmitted from a neighbor BS at operation 410.

The D2D device calculates PL based on the D2D transmission power parameters at operation 420. The D2D device determines transmission power for D2D transmission based on the PL at operation 430. Here, the D2D device may calculate PL based on RSRP for the serving BS, or RSRP for the neighbor BS.

The D2D device transmits a D2D discovery signal using the determined transmission power through a predetermined D2D transmission resource or a D2D transmission resource which is scheduled by a BS at operation 440.

Transmission power which is determined as described in FIG. 4, or transmission power which is determined according to a procedure which is similar to FIG. 4 may be used for transmitting D2D data.

Although FIG. 4 illustrates an example of a D2D transmitting operation on a non-serving carrier in a D2D device in a communication system supporting a D2D scheme according to an embodiment of the present disclosure, various changes could be made to FIG. 4. For example, although shown as a series of operations, various operations in FIG. 4 could overlap, occur in parallel, occur in a different order, or occur multiple times.

An example of a D2D transmitting operation on a non-serving carrier in a D2D device in a communication system supporting a D2D scheme according to an embodiment of the present disclosure has been described with reference to FIG. 4, and another example of a D2D transmitting operation on a non-serving carrier in a D2D device in a communication system supporting a D2D scheme according to an embodiment of the present disclosure will be described with reference to FIG. 5.

Figure 5:
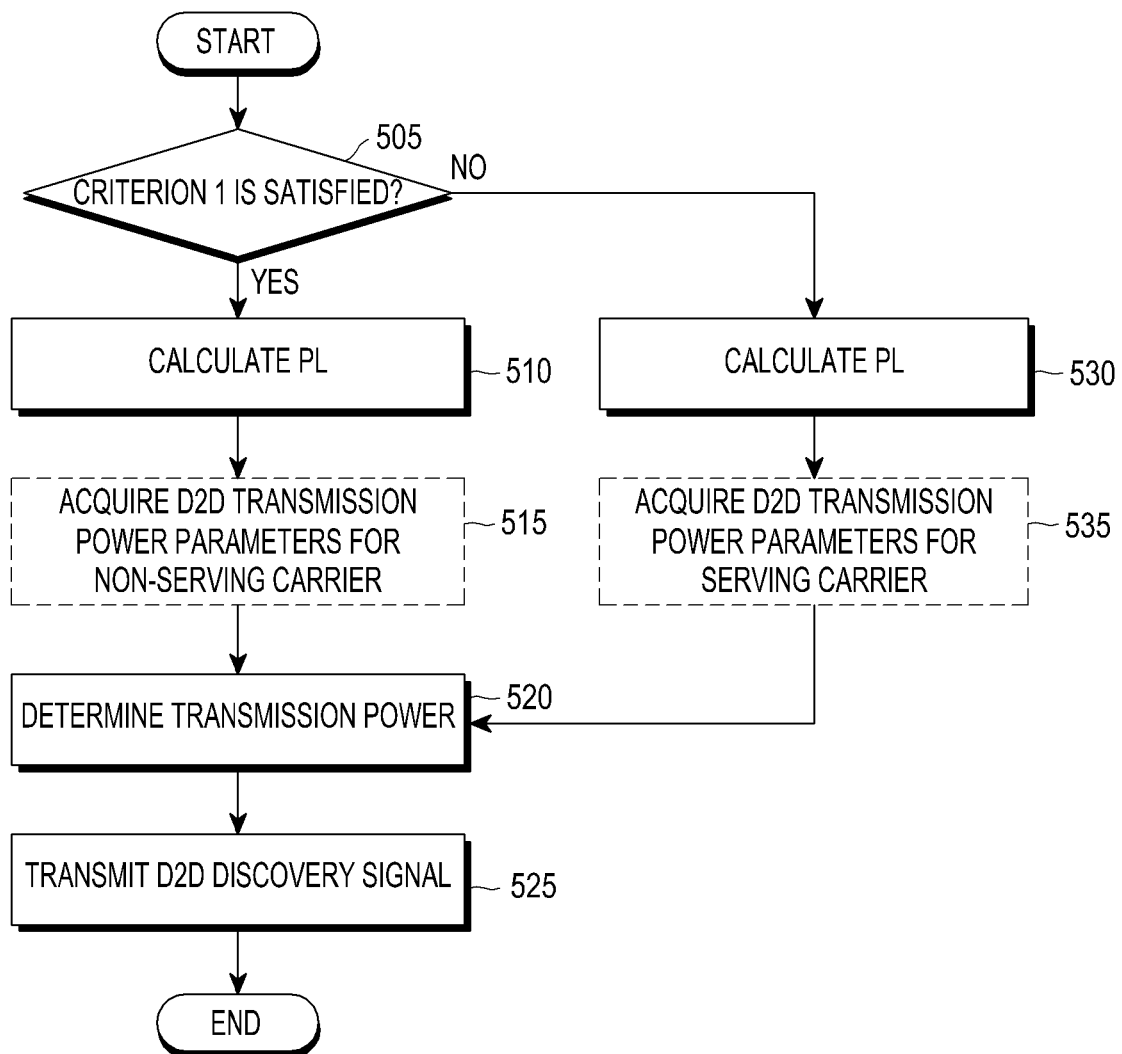
FIG. 5 schematically illustrates another example of a D2D transmitting operation on a non-serving carrier in a D2D device in a communication system supporting a D2D scheme according to an embodiment of the present disclosure.

FIG. 5 schematically illustrates another example of a D2D transmitting operation on a non-serving carrier in a D2D device in a communication system supporting a D2D scheme according to an embodiment of the present disclosure.

Referring to FIG. 5, a D2D device determines whether a criterion 1, as a criterion for determining to use RSRP for a neighbor BS, is satisfied in order to calculate PL at operation 505. If the criterion 1 is satisfied, the D2D device proceeds to operation 510. If the criterion 1 is not satisfied, the D2D device proceeds to operation 530. The criterion 1 will be described below, so a detailed description will be omitted herein.

The D2D device calculates PL based on RS transmission power of a neighbor BS which provides a non-serving carrier and RSRP which is measured for an RS received from the neighbor BS at operation 510. The D2D device acquires D2D transmission power parameters for the non-serving carrier from a BS which manages a serving cell or a neighbor BS at operation 515. Referring to FIG. 5, operation 510 is performed prior to operation 515. However, it will be understood by those of ordinary skill in the art that operation 515 may be performed prior to operation 510, or operation 510 and operation 515 may be performed at the same time. The D2D device determines transmission power for the non-serving carrier based on the calculated PL and the D2D transmission power parameters at operation 520. The D2D device transmits a D2D discovery signal using the determined transmission power through the non-serving carrier at operation 525.

The D2D device calculates PL based on RS transmission power of a serving BS which provides a serving carrier and RSRP which is measured for an RS received from the serving BS at operation 530. The D2D device acquires D2D transmission power parameters for the serving carrier based on system information which is transmitted from the BS which manages the serving cell at operation 535, and proceeds to operation 520. Referring to FIG. 5, operation 530 is performed prior to operation 535. However, it will be understood by those of ordinary skill in the art that operation 535 may be performed prior to operation 530, or operation 530 and operation 535 may be performed at the same time. The D2D device determines transmission power for the non-serving carrier based on the calculated PL and the D2D transmission power parameters at operation 520. The D2D device transmits a D2D discovery signal using the determined transmission power through the non-serving carrier at operation 525.

The criterion 1 will be described below.

Firstly, in an embodiment of the present disclosure, an implicit command of a serving BS may be used. For example, a D2D device determines whether a serving BS provides D2D transmission power parameters for a D2D transmitting operation on a non-serving carrier. If the serving BS provides the D2D transmission power parameters for the D2D transmitting operation on the non-serving carrier, the D2D device may determine that the serving BS implicitly commands the D2D device to use RSRP for a neighbor BS. That is, if the D2D device acquires the D2D transmission power parameters for the non-serving carrier from the serving BS, the D2D device determines to use RSRP for a neighbor BS in order to calculate PL.

Alternatively, if the serving BS does not provide the D2D transmission power parameters on the non-serving carrier, the D2D device determines to use RSRP for the serving BS in order to calculate the PL, or does not perform a transmission power control operation. If the transmission power control operation is not performed, the D2D device uses maximum transmission power. This implicit command method may be applied to all of a D2D device which is in an RRC connected mode and a D2D device which is in an RRC idle mode.

Further, in another embodiment of the present disclosure, a serving BS explicitly commands an operation of a D2D device for RSRP measurement on a non-serving carrier to the D2D device. For this, for example, a dedicated signaling may be used, and this will be described below.

Firstly, a D2D device determines whether a serving BS commands the D2D device to measure RSRP on a non-serving carrier. If the serving BS commands the D2D device to measure the RSRP on the non-serving carrier, the D2D device determines to use RSRP for a neighbor BS in order to calculate PL. Here, the serving BS commands the D2D device to measure the RSRP on the non-serving carrier, and provides D2D transmission power parameters for the non-serving carrier to the D2D device.

Alternatively, if the serving BS does not command the D2D device to measure the RSRP on the non-serving carrier, or if the serving BS commands the D2D device to measure RSRP on a serving carrier, the D2D device determines to use RSRP for a serving BS which provides the serving carrier in order to calculate PL. For example, if the serving BS commands the D2D device to measure the RSRP on the serving carrier, the serving BS does not need to provide D2D transmission power parameters on the non-serving carrier. Then, the D2D device calculates transmission power for D2D transmission using D2D transmission power parameters which are used on the serving carrier and RSRP on the serving carrier.

Although FIG. 5 illustrates another example of a D2D transmitting operation on a non-serving carrier in a D2D device in a communication system supporting a D2D scheme according to an embodiment of the present disclosure, various changes could be made to FIG. 5. For example, although shown as a series of operations, various operations in FIG. 5 could overlap, occur in parallel, occur in a different order, or occur multiple times.

Another example of a D2D transmitting operation on a non-serving carrier in a D2D device in a communication system supporting a D2D scheme according to an embodiment of the present disclosure has been described with reference to FIG. 5, and a process for providing system information of a neighbor cell for performing a D2D transmitting operation on a non-serving carrier in a communication system supporting a D2D scheme according to an embodiment of the present disclosure will be described with reference to FIG. 6.

Figure 6:
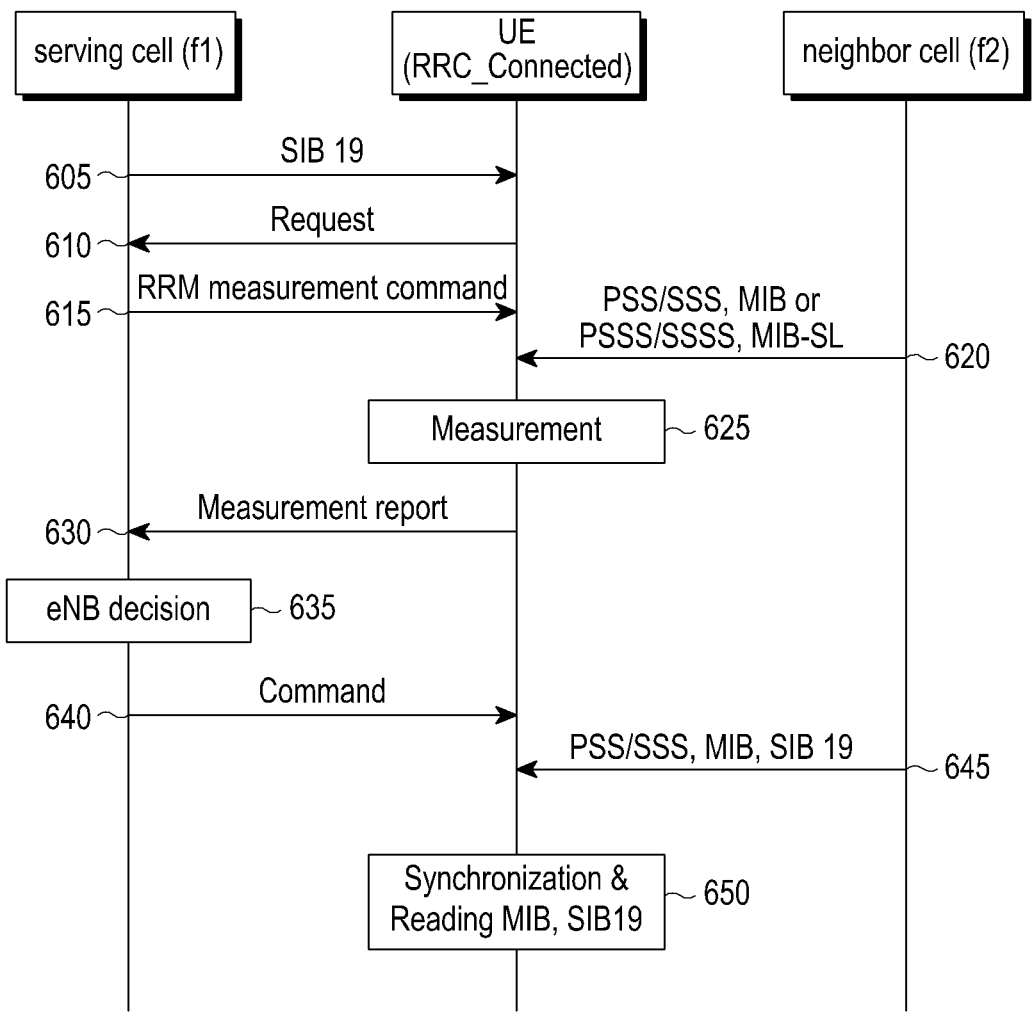
FIG. 6 schematically illustrates a process for providing system information of a neighbor cell for performing a D2D transmitting operation on a non-serving carrier in a communication system supporting a D2D scheme according to an embodiment of the present disclosure.

FIG. 6 schematically illustrates a process for providing system information of a neighbor cell for performing a D2D transmitting operation on a non-serving carrier in a communication system supporting a D2D scheme according to an embodiment of the present disclosure.

Referring to FIG. 6, in the communication system, it will be assumed that a serving carrier used in a serving cell is f1, a non-serving carrier used in a neighbor cell is f2, and a D2D device is in an RRC connected mode in which a connection is maintained with a BS which manages a serving cell.

A serving BS, which manages a serving cell which provides a serving carrier f1, transmits transmission power parameters for D2D communication on a serving carrier through an SIB 19 at operation 605. For D2D transmission on a non-serving carrier f2, a D2D device transmits a request message for requesting system information of a neighbor cell which provides a non-serving carrier to the serving BS at operation 610. In an embodiment of the present disclosure, for example, the request message at operation 610 may include discTxInterest indicating that the D2D device wants to transmit a D2D discovery signal on a non-serving carrier, and interested frequency indicating a carrier frequency of a non-serving carrier on which the D2D device wants to transmit the D2D discovery signal. For example, if the D2D device is in an RRC connected mode, the request message may be implemented as ProseUEInformation. Alternatively, if the D2D device is in an RRC idle mode, the D2D device transits from the RRC idle mode to an RRC connected mode, and may transmit ProseUEInformation on the RRC idle mode.

The serving BS transmits a radio resource management (RRM) measurement command message to the D2D device at operation 615. The RRM measurement command message may include at least one of a measurement period, a measurement frequency, and an ID of a measurement cell for RRM measurement. For example, the measurement frequency may be f2.

The D2D device performs a synchronization operation with a neighbor cell using a PSS/SSS of a neighbor cell which uses a non-serving carrier f2, and receives a master information block (MIB) from a BS which manages the neighbor cell, i.e., a neighbor BS at operation 620. The MIB includes information on a bandwidth and an SFN used in the neighbor cell.

If the frequency f2 which is commanded to measure by the serving BS is a frequency used in an out-of-coverage environment at which there is no BS, not a frequency used in the neighbor cell, the D2D device performs a synchronization operation using a primary SSS (PSSS) and/or a secondary SSS (SSSS) which is transmitted by D2D devices which are in the out-of-coverage environment for D2D communication, and receives a MIB-sidelink (MIB-SL) from a related synchronized D2D device. For convenience, a PSSS and/or an SSSS will be referred to as "PSSS/SSSS". The MIB-SL includes information necessary for receiving an RS which is transmitted from the synchronized D2D device. For example, the MIB-SL may include a D2D frame number which is implemented by 14 bits, an ID which informs a time division duplex (TDD) uplink-downlink (UL-DL) configuration and which is implemented by 3 bits, an In-coverage indicator which is implemented by 1 bit, D2D system bandwidth information which is implemented by 3 bits, and the like. Here, if a frequency division duplex (FDD) scheme is applied, a value of the ID which informs the TDD UL-DL configuration and which is implemented by 3 bits may be '000'. The In-coverage indicator indicates whether the D2D device is located within a coverage or out of a coverage.

The D2D device measures RSRP for a cell-specific reference signal (CRS) which is transmitted from a neighbor BS or RSRP for a de-modulation reference signal (DMRS) which is transmitted by a D2D device which is in an out-of-coverage environment through a physical sidelink broadcast channel (PSBCH) at operation 625, and transmits a measurement report message including the measurement result to the serving BS at operation 630.

The serving BS determines whether the D2D device will receive an SIB of a neighbor BS which provides a non-serving carrier based on the measurement report message received from the D2D device at operation 635. The serving BS transmits a command message including a command according to the determined result to the D2D device at operation 640. If the command indicates that the serving BS allows the D2D device to receive the SIB of the neighbor cell which provides the non-serving carrier, the D2D device receives the SIB from a BS of the neighbor cell, acquires D2D transmission power parameters from the SIB, and acquires referenceSignalPower as RS transmission power of the neighbor cell through an RRC signaling at operation 645. Then, the D2D device may determine transmission power for D2D transmission on a non-serving carrier based on the acquired information at operation 650.

A process for providing system information of a neighbor cell for performing a D2D transmitting operation on a non-serving carrier in a communication system supporting a D2D scheme according to an embodiment of the present disclosure has been described with reference to FIG. 6, and a process for supporting a D2D transmitting operation on a non-serving carrier in a BS in a communication system supporting a D2D scheme according to an embodiment of the present disclosure will be described with reference to FIG. 7.

Figure 7:
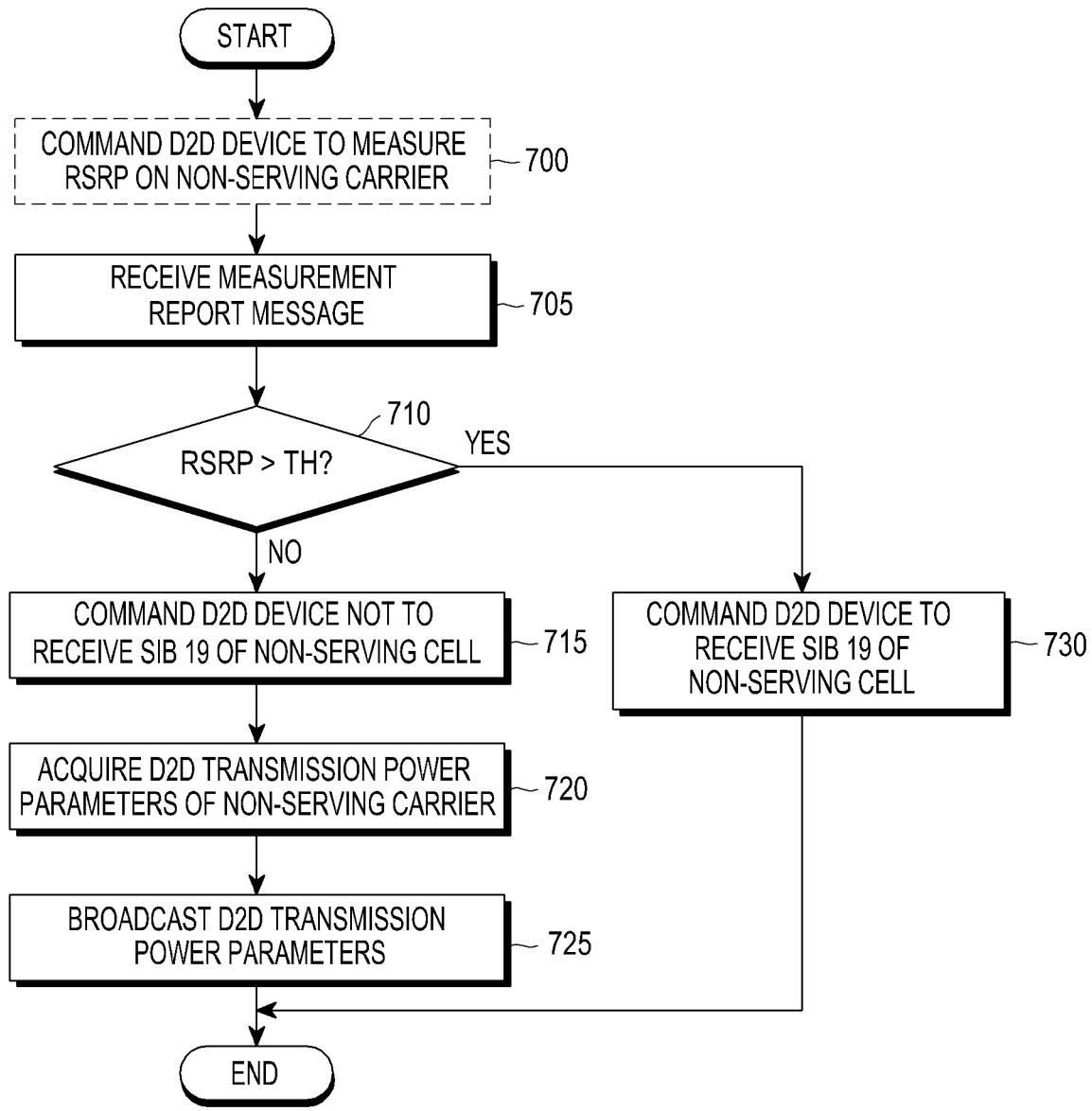
FIG. 7 schematically illustrates a process for supporting a D2D transmitting operation on a non-serving carrier in a base station (BS) in a communication system supporting a D2D scheme according to an embodiment of the present disclosure.

FIG. 7 schematically illustrates a process for supporting a D2D transmitting operation on a non-serving carrier in a BS in a communication system supporting a D2D scheme according to an embodiment of the present disclosure.

Referring to FIG. 7, a BS may command a D2D device within a cell which is managed by the BS to measure RSRP on a non-serving carrier at operation 700. For convenience, it will be assumed that there is one D2D device within the cell which is managed by the BS. Alternatively, there may be at least one D2D device within the cell which is managed by the BS. Alternatively, the BS provides D2D transmission power parameters for D2D transmission on the non-serving carrier through an SIB, and the D2D device may determine to perform RSRP measurement on the non-serving carrier in response to reception of the D2D transmission power parameters. The BS may command the D2D device to measure RSRP on the non-serving carrier according to request of the D2D device or determination of the BS.

The BS receives a measurement report message including an RRNI measurement result from the D2D device at operation 705. The BS determines whether RSRP which is indicated by the RRM measurement result is greater than a preset threshold value TH at operation 710. If the RSRP is greater than the threshold value, the BS proceeds to operation 730. If the RSRP is less than or equal to the threshold value, the BS proceeds to operation 715.

The BS commands the D2D device to receive an SIB 19 of a neighbor cell which provides a non-serving carrier at operation 730. The command may be implicitly or explicitly transmitted to the D2D device. For example, if an implicit command is used, the serving BS does not provide information on D2D transmission power parameters which are used on a non-serving carrier at a serving cell. For another example, if an explicit command is used, the serving BS may transmit a dedicated signaling for commanding a D2D device within a serving cell to receive an SIB of a neighbor cell or may transmit information indicating that the serving BS does not provide D2D transmission power parameters on a non-serving carrier through an SIB.

The BS commands the D2D device not to receive an SIB 19 of a neighbor cell which provides a non-serving carrier at operation 715. This is why the BS determines that the D2D device may not normally receive a signal of the neighbor cell since the RSRP which is measured in the D2D device is less than the threshold value. Alternatively, the BS does not transmit a reception command for a non-serving carrier to the D2D device, so the BS may implicitly command the D2D device not to receive an SIB 19 of the neighbor cell.

The BS acquires D2D transmission power parameters (and RS transmission power of a neighbor cell if necessary) which may be used on a non-serving carrier from a BS of the neighbor cell, an MME, or other local entity through an X2 interface, an S1 interface, or other interface at operation 720. The BS broadcasts the acquired D2D transmission power parameters through an SIB 19 at operation 725. If necessary, the BS transmits information on the RS transmission power of the neighbor cell to D2D devices within the serving cell through an RRC signaling at operation 725.

Although FIG. 7 illustrates a process for supporting a D2D transmitting operation on a non-serving carrier in a BS in a communication system supporting a D2D scheme according to an embodiment of the present disclosure, various changes could be made to FIG. 7. For example, although shown as a series of operations, various operations in FIG. 7 could overlap, occur in parallel, occur in a different order, or occur multiple times.

A process for supporting a D2D transmitting operation on a non-serving carrier in a BS in a communication system supporting a D2D scheme according to an embodiment of the present disclosure has been described with reference to FIG. 7, and an inner structure of a D2D device in a communication system supporting a D2D scheme according to an embodiment of the present disclosure will be described with reference to FIG. 8.

Figure 8:
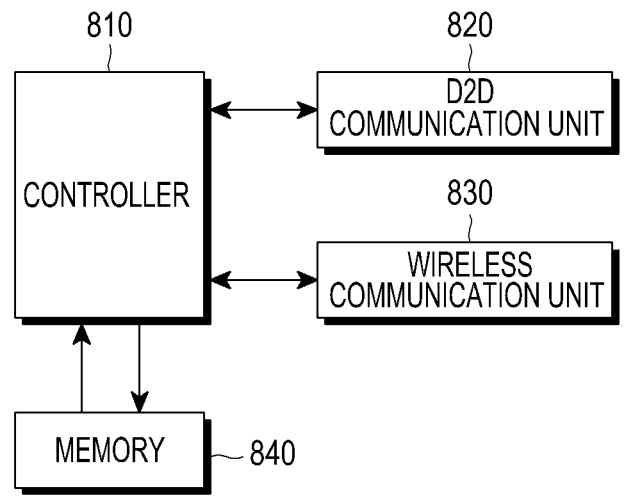
FIG. 8 schematically illustrates an inner structure of a D2D device in a communication system supporting a D2D scheme according to an embodiment of the present disclosure.

FIG. 8 schematically illustrates an inner structure of a D2D device in a communication system supporting a D2D scheme according to an embodiment of the present disclosure.

Referring to FIG. 8, a D2D device includes a controller 810, a D2D communication unit 820, a wireless communication unit 830, and a memory 840.

The D2D communication unit 820 generates and transmits a D2D discovery signal and/or a control/data signal for D2D communication, or receives and detects a D2D discovery signal and/or a control/data signal from other D2D device.

The wireless communication unit 830 is responsible for transmitting and receiving a signal from various entities, such as a BS.

The controller 810 controls the overall operation of the D2D device, and controls the D2D communication unit 820 and the wireless communication unit 830 according to at least one of various embodiments of the present disclosure. More particularly, the controller 810 controls an operation related to an operation of transmitting and receiving a D2D discovery signal according to an embodiment of the present disclosure. The operation related to the operation of transmitting and receiving the D2D discovery signal according to an embodiment of the present disclosure is performed in the manner described with reference to FIGS. 1 to 7, and a description thereof will be omitted herein.

The memory 840 may store a program code and parameters necessary for an operation of the controller 810.

While the controller 810, the D2D communication unit 820, the wireless communication unit 830, and the memory 840 are described in the D2D device as separate units, it is to be understood that this is merely for convenience of description. In other words, two or more of the controller 810, the D2D communication unit 820, the wireless communication unit 830, and the memory 840 may be incorporated into a single unit.

The D2D device may be implemented with one processor.

An inner structure of a D2D device in a communication system supporting a D2D scheme according to an embodiment of the present disclosure has been described with reference to FIG. 8, and an inner structure of a BS in a communication system supporting a D2D scheme according to an embodiment of the present disclosure will be described with reference to FIG. 9.

Figure 9:
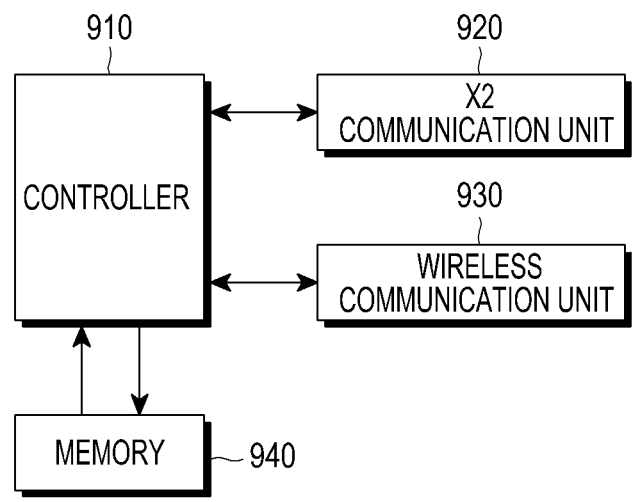
FIG. 9 schematically illustrates an inner structure of a BS in a communication system supporting a D2D scheme according to an embodiment of the present disclosure.

FIG. 9 schematically illustrates an inner structure of a BS in a communication system supporting a D2D scheme according to an embodiment of the present disclosure.

Referring to FIG. 9, a BS includes a controller 910, an X2 communication unit 920, a wireless communication unit 930, and a memory 940.

The X2 communication unit 920 is responsible for communication between BS, transmits information necessary for supporting D2D communication to other BS, and receives information necessary for supporting D2D communication from other BS to transfer the information received from the other BS to the controller 910.

The wireless communication unit 930 is responsible for signal transmission/reception with D2D devices.

The controller 910 controls the X2 communication unit 920 and the wireless communication unit 930 according to at least one of various embodiments of the present disclosure.

The memory 940 may store a program code and parameters necessary for an operation of the controller 910.

The controller 910 controls the overall operation of the BS, and more particularly, the controller 910 controls an operation related to an operation of transmitting and receiving a D2D discovery signal according to an embodiment of the present disclosure. The operation related to the operation of transmitting and receiving the D2D discovery signal according to an embodiment of the present disclosure is performed in the manner described with reference to FIGS. 1 to 7, and a description thereof will be omitted herein.

While the controller 910, the X2 communication unit 920, the wireless communication unit 930, and the memory 940 are described in the BS as separate units, it is to be understood that this is merely for convenience of description. In other words, two or more of the controller 910, the X2 communication unit 920, the wireless communication unit 930, and the memory 940 may be incorporated into a single unit.

The BS may be implemented with one processor.

As described above, various embodiments of the present disclosure support D2D signal transmission on a non-serving carrier thereby a UE may normally perform D2D communication even though the UE may not transmit a D2D signal on a serving carrier.

As is apparent from the foregoing description, an embodiment of the present disclosure enables to transmit and receive a D2D discovery signal in a communication system supporting a D2D scheme.

An embodiment of the present disclosure enables to control transmission power used for transmitting a D2D discovery signal in a communication system supporting a D2D scheme.

An embodiment of the present disclosure enables to transmit and receive a D2D discovery signal on a carrier which is not used at a serving cell in a communication system supporting a D2D scheme.

An embodiment of the present disclosure enables to control transmission power used for transmitting a D2D discovery signal on a carrier which is not used at a serving cell in a communication system supporting a D2D scheme.

An embodiment of the present disclosure enables to transmit and receive system information in a communication system supporting a D2D scheme.

An embodiment of the present disclosure enables to transmit and receive system information of a neighbor cell at a serving cell in a communication system supporting a D2D scheme.

An embodiment of the present disclosure enables to transmit and receive system information for inter-carrier D2D discovery in a communication system supporting a D2D scheme.

An embodiment of the present disclosure enables to transmit and receive a discovery signal for inter-carrier D2D discovery in a communication system supporting a D2D scheme.

An embodiment of the present disclosure enables to control transmission power used for transmitting a discovery signal for inter-carrier D2D discovery in a communication system supporting a D2D scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disk-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a sidelink transmission by a user equipment (UE) in a communication system, the method comprising:
    determining a transmission power for transmitting a sidelink discovery signal on a carrier of other cell different from a serving cell; and
    transmitting the sidelink discovery signal using the transmission power on the carrier of the other cell,
    wherein the transmission power is determined based on a path loss for the other cell, and information on the carrier of the other cell is received on a carrier of the serving cell.

2. The method of claim 1, further comprising:
    receiving sidelink discovery resource information for the other cell from the serving cell.

3. The method of claim 2, wherein the sidelink discovery resource information for the other cell includes sidelink transmission power parameters which are related to the transmission of the sidelink discovery signal.

4. The method of claim 1, wherein sidelink transmission power parameters are related to a corresponding a sidelink discovery resource configuration.

5. A method for supporting a sidelink transmission in a user equipment (UE) by a serving base station (BS) in a communication system, the method comprising:
    obtaining sidelink discovery resource information for other cell, and
    transmitting the sidelink discovery resource information for the other cell on a serving cell,
    wherein the sidelink discovery resource information for the other cell is used in a sidelink discovery signal transmission on a carrier of the other cell, and the sidelink discovery resource information for the other cell includes sidelink transmission power parameters which are related to the transmission of the sidelink discovery signal in a UE.

6. The method of claim 5, wherein the sidelink transmission power parameters are related to a corresponding sidelink discovery resource configuration.

7. A user equipment (UE) in a communication system performing sidelink transmission, the UE comprising:
    a transceiver; and
    a processor configured to:
        determine a transmission power for transmitting a sidelink discovery signal on a carrier of other cell different from a serving cell, and
        transmit the sidelink discovery signal using the transmission power on the carrier of the other cell,
    wherein the transmission power is determined based on a path loss for the other cell, and information on the carrier of the other cell is received on a carrier of the serving cell.

8. The UE of claim 7, wherein the processor is further configured to:
    receive sidelink discovery resource information for other cell from the serving cell.

9. The UE of claim 8, wherein the sidelink discovery resource information for the other cell includes sidelink transmission power parameters which are related to the transmission of the sidelink discovery signal.

10. The UE of claim 7, wherein sidelink transmission power parameters are related to a corresponding sidelink discovery resource configuration.

11. A base station in a communication system supporting a sidelink transmission, the base station comprising:
    a transceiver; and
    a processor configured to:
        obtain sidelink discovery resource information for other cell, and
        transmit the sidelink discovery resource information for the other cell on a serving cell,
    wherein the sidelink discovery resource information for the other cell is used in a sidelink discovery signal transmission on a carrier of other cell, and the sidelink discovery resource information for the other cell includes sidelink transmission power parameters which are related to the transmission of the sidelink discovery signal in a UE.

12. The base station of claim 11, wherein the sidelink transmission power parameters are related to a corresponding the sidelink discovery resource configuration.

* * * * *